US009019551B2

(12) United States Patent
Hayashi et al.

(10) Patent No.: US 9,019,551 B2
(45) Date of Patent: Apr. 28, 2015

(54) IMAGE FORMING APPARATUS AND IMAGE CORRECTION METHOD THAT CALCULATE CORRECTION AMOUNTS ASSOCIATED WITH A MAIN SCANNING DIRECTION

(71) Applicants: Masayuki Hayashi, Osaka (JP); Tatsuya Miyadera, Kanagawa (JP); Motohiro Kawanabe, Osaka (JP); Yoshinori Shirasaki, Osaka (JP); Masatoshi Murakami, Osaka (JP)

(72) Inventors: Masayuki Hayashi, Osaka (JP); Tatsuya Miyadera, Kanagawa (JP); Motohiro Kawanabe, Osaka (JP); Yoshinori Shirasaki, Osaka (JP); Masatoshi Murakami, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/043,258

(22) Filed: Oct. 1, 2013

(65) Prior Publication Data
US 2014/0146371 A1 May 29, 2014

(30) Foreign Application Priority Data
Nov. 28, 2012 (JP) .................................. 2012-260158

(51) Int. Cl.
H04N 1/40 (2006.01)
H04N 1/50 (2006.01)

(52) U.S. Cl.
CPC ..................................... H04N 1/506 (2013.01)

(58) Field of Classification Search
USPC .......................... 347/234; 358/1.13, 1.18, 518
See application file for complete search history.

(56) References Cited

U.S. PATENT DOCUMENTS

| 5,181,137 | A | * | 1/1993 | Koide ........................ 359/217.1 |
| 5,402,252 | A | * | 3/1995 | Kojima ......................... 358/486 |
| 5,579,092 | A | * | 11/1996 | Isobe et al. ..................... 399/39 |
| 5,828,925 | A | * | 10/1998 | Yoshizawa ..................... 399/39 |
| 6,657,650 | B1 | * | 12/2003 | Omelchenko et al. ........ 347/234 |
| 7,570,386 | B2 | * | 8/2009 | Heink et al. .................. 358/1.18 |
| 8,331,738 | B2 | * | 12/2012 | Hosier et al. .................. 382/309 |
| 2003/0133002 | A1 | * | 7/2003 | Morita .......................... 347/139 |
| 2004/0247355 | A1 | * | 12/2004 | Eguchi ......................... 399/391 |
| 2005/0212902 | A1 | * | 9/2005 | Cook et al. .................... 347/248 |
| 2007/0097465 | A1 | * | 5/2007 | Kobayashi et al. ........... 358/518 |

(Continued)

FOREIGN PATENT DOCUMENTS

| JP | 2010-140019 | 6/2010 |
| JP | 2013-109295 | 6/2013 |
| JP | 2013109295 A * | 6/2013 ............. G03G 21/08 |

OTHER PUBLICATIONS

U.S. Appl. No. 13/683,248, filed Nov. 21, 2012.

Primary Examiner — Fred Guillermety
Assistant Examiner — Edwin S Leland, III
(74) Attorney, Agent, or Firm — Oblon, McClelland, Maier & Neustadt, L.L.P.

(57) ABSTRACT

Disclosed is an image forming apparatus including, at least, an image data storage unit that stores image data; an inclination amount detection unit that detects a first inclination amount of a portion of the image data spanning from one end to the other end relative to a main scanning direction; an inclination amount storage unit that stores, when a gradient of the image data changes at a point in the main scanning direction, a second inclination amount of a portion of the image data spanning from the one end to the point or from the other end to the point; a correction amount calculation unit that calculates correction amounts associated with the main scanning direction by switching, at the point, whether the first inclination amount is increased or decreased by the second inclination amount; and an image correction unit that corrects an image based on the correction amounts.

5 Claims, 14 Drawing Sheets

(56) References Cited

U.S. PATENT DOCUMENTS

| | | | |
|---|---|---|---|
| 2007/0188589 A1* | 8/2007 | Kusunose et al. | 347/238 |
| 2008/0218786 A1* | 9/2008 | Maebashi | 358/1.12 |
| 2009/0009823 A1* | 1/2009 | Motoyama | 358/474 |
| 2009/0009830 A1* | 1/2009 | Saito | 358/505 |
| 2009/0190178 A1* | 7/2009 | Saito | 358/1.16 |
| 2010/0097623 A1* | 4/2010 | Ooya | 358/1.9 |
| 2010/0103441 A1* | 4/2010 | Ooya | 358/1.9 |
| 2010/0119273 A1* | 5/2010 | Komai et al. | 399/395 |
| 2011/0164261 A1* | 7/2011 | Hayashi et al. | 358/1.8 |
| 2011/0222128 A1* | 9/2011 | Wada | 358/3.27 |
| 2011/0267635 A1* | 11/2011 | Seki | 358/1.13 |
| 2012/0075681 A1* | 3/2012 | Inoue | 358/498 |
| 2012/0140248 A1* | 6/2012 | Tamura | 358/1.2 |
| 2013/0050723 A1* | 2/2013 | Woo et al. | 358/1.9 |
| 2013/0071130 A1* | 3/2013 | Hayashi et al. | 399/27 |
| 2013/0083148 A1* | 4/2013 | Miyatake et al. | 347/224 |
| 2013/0120803 A1* | 5/2013 | Hirose | 358/453 |
| 2014/0078521 A1* | 3/2014 | Hayashi et al. | 358/1.2 |
| 2014/0139607 A1* | 5/2014 | Hayashi et al. | 347/224 |
| 2014/0177011 A1* | 6/2014 | Hasegawa | 358/474 |

* cited by examiner

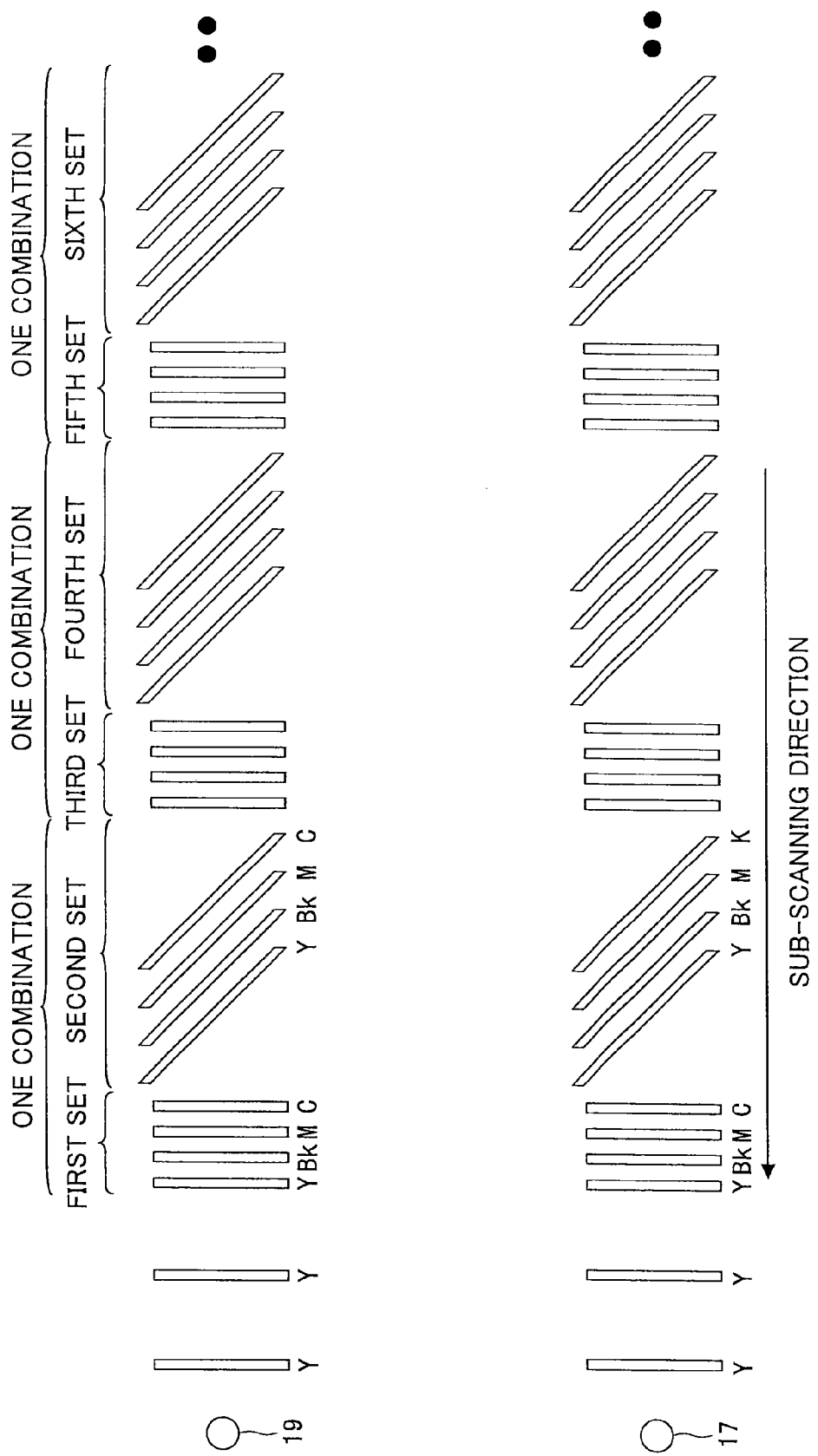

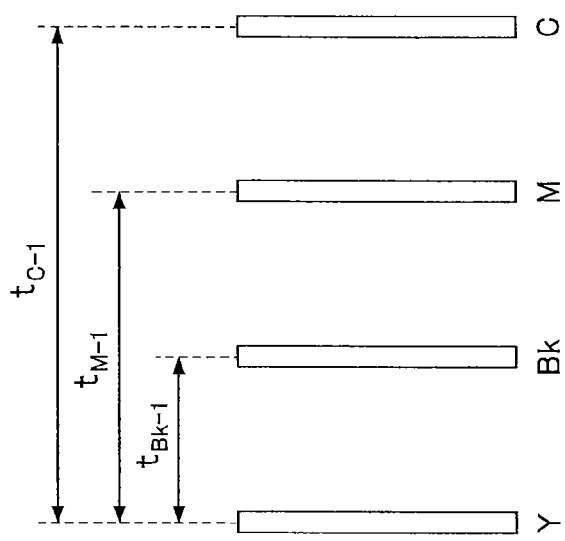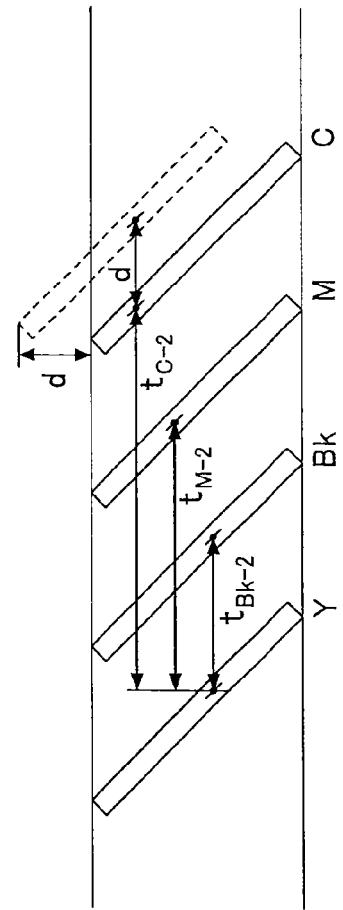
FIG.7A
FIG.7B

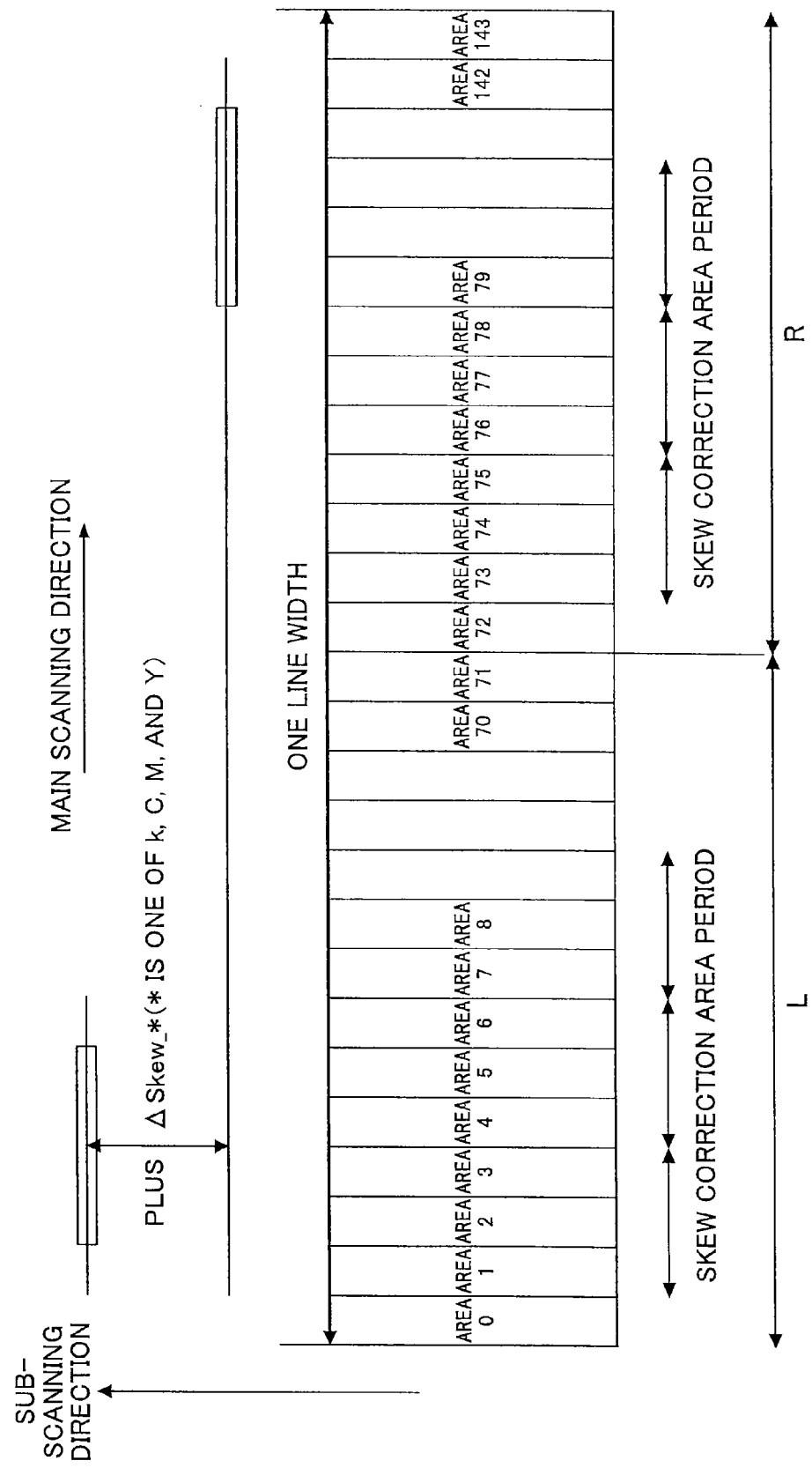

FIG.10A · CYAN IMAGE IS SKEWING WITH RESPECT TO BLACK IMAGE
(RESOLUTION: 600 dpi × 600 dpi)

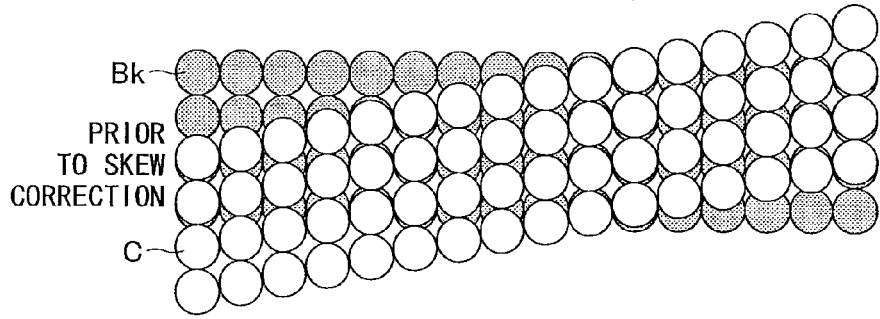

FIG.10B · CYAN IMAGE IS DIVIDED IN THE MAIN SCANNING
DIRECTION, AND CYAN IMAGE IS SHIFTED IN ACCORDANCE
WITH SKEW AMOUNTS (RESOLUTION: 600 dpi × 600 dpi)

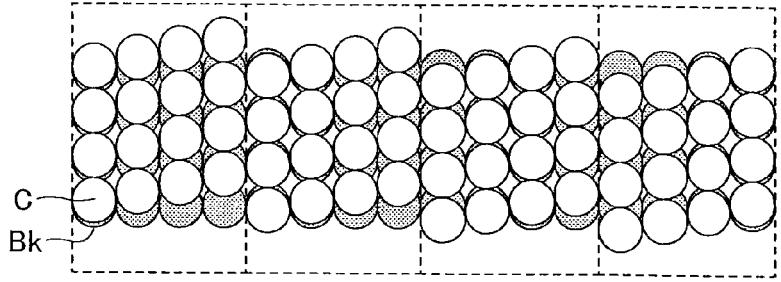

FIG.10C · RESOLUTION IN THE SUB-SCANNING DIRECTION
IS DOUBLED, AND CYAN IMAGE IS SHIFTED
IN ACCORDANCE WITH THE SKEW AMOUNT
(RESOLUTION: 600 dpi × 1200 dpi)

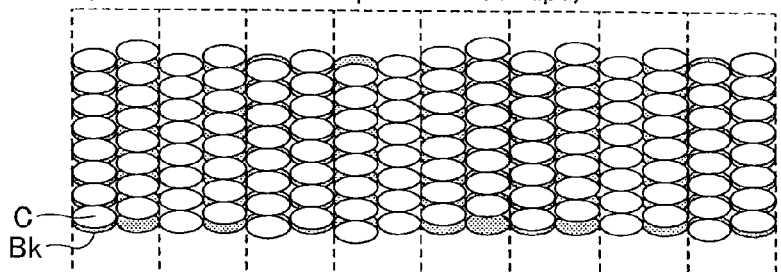

FIG.10D · RESOLUTION IN THE MAIN SCANNING DIRECTION AND IN
THE SUB-SCANNING DIRECTION ARE DOUBLED, AND CYAN
IMAGE IS SHIFTED IN ACCORDANCE WITH THE SKEW AMOUNTS
(RESOLUTION: 1200 dpi × 1200 dpi)

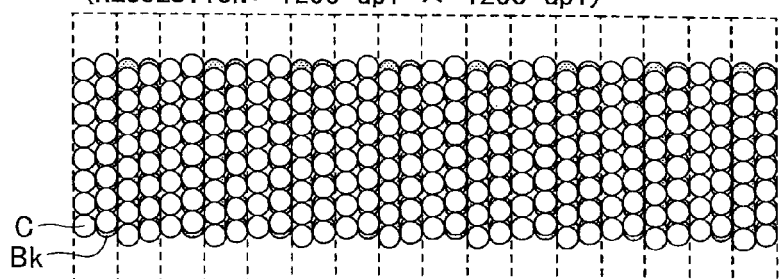

FIG.12

| BENDING CORRECTION AMOUNT TABLE | ΔCurve_k | ΔCurve_c | ΔCurve_m | ΔCurve_y |
|---|---|---|---|---|
| 0 | 0 | −8 | −12 | −15 |
| 1 | 0 | −6 | −9 | −12 |
| 2 (Default) | 0 | −5 | −7 | −10 |
| 3 | 0 | −4 | −6 | −8 |
| 4 | 0 | −2 | −4 | −5 |
| 5 | 7 | 0 | −4 | −7 |
| 6 | 6 | 0 | −3 | −6 |
| 7 | 5 | 0 | −2 | −5 |
| 8 | 4 | 0 | −2 | −4 |
| 9 | 2 | 0 | −1 | −2 |

AREAS 0~47 48~95 96~143

IMAGE FORMING APPARATUS AND IMAGE CORRECTION METHOD THAT CALCULATE CORRECTION AMOUNTS ASSOCIATED WITH A MAIN SCANNING DIRECTION

BACKGROUND OF THE INVENTION

1. Field of the Invention

The present invention relates to an electrophotographic image forming apparatus, and especially to an image forming apparatus having a function to correct an image.

2. Description of the Related Art

In an electrophtographic image forming apparatus, in order to expose a photoreceptor, a Light-Emitting Diode (LED) may be used as a light source. LEDs can be arranged to correspond to pixels. In this case, the LEDs are disposed as an LED array, which are arranged in a main scanning direction. An image forming apparatus, which is capable of outputting a full-color image, includes a tandem type image forming apparatus having LED arrays. Here, the LED arrays are for corresponding colors of photoreceptors for developing a cyan (C) toner image, a magenta (M) toner image, a yellow (Y) toner image, and a black (K) toner image, respectively. The tandem type image forming apparatus forms a full-color image by sequentially forming and superposing images in the corresponding colors on an intermediate transfer belt or on a paper sheet. If toner image forming positions for the corresponding colors are shifted, an image having a color deviation is eventually formed.

To address this problem, in many cases, a tandem type color image forming apparatus includes a color deviation correcting function (e.g., Patent Document 1 (Japanese Unexamined Patent Publication No. 2010-140019)). FIG. 1 is a diagram illustrating an example of a color deviation correcting pattern. The color deviation correcting pattern includes lines in the corresponding colors of C, M, Y, and K, which are in parallel with the main scanning direction; and lines, which are slanted with respect to the main scanning direction by a constant angle. The image forming apparatus includes optical sensors 21 and 22 which read the color deviation correcting pattern. Here, the optical sensors 21 and 22 are separated from each other in the main scanning direction. For example, a registration deviation of the color of C in a sub-scanning direction is corrected based on a distance from a line K 11 to a line C 11, while setting the line K 11 as a reference line. A registration deviation of the color of M in the sub-scanning direction is corrected based on a distance to a line M 11, and a registration deviation of the color of Y in the sub-scanning direction is corrected based on a distance to a line Y 11. Similarly, a registration deviation of the color of C in the main scanning direction is corrected based on a distance from a line K 12 to a line C 12, while setting the line K 12 as a reference line. A registration deviation of the color of M in the main scanning direction is corrected based on a distance to a line M 12, and a registration deviation of the color of Y in the main scanning direction is corrected based on a distance to a line Y 12.

Additionally, the image forming apparatus may perform skew correction for reducing a color deviation, which is caused by tilting of the LED arrays in the main scanning direction. In the skew correction, the left and right color sensors read the correcting pattern, and a skew amount KC_Skew of the color of C with respect to the color of K is calculated, for example. The image forming apparatus performs the skew correction by shifting a timing for reading out pixel data corresponding to the skew amount KC_Skew, for a position of the pixel in the main scanning direction (by shifting the pixel, which is read out from a line memory, in the sub-scanning direction).

In the skew correction according to the related art, an amount of the color deviation is detected by the optical sensors, which are disposed at the corresponding two positions in left and right. Thus, linear skew may be corrected. However, bending skew may not be corrected. To correct the bending skew (which is skew such that a gradient is changed in the middle in the main scanning direction), another optical sensor may be added to a position other than the two positions in left and right. However, in this case, the cost may be increased.

There are many causes of the color deviation. The skew of the LED array is not necessarily the linear skew. For the case of the bending skew, if only the two optical sensors are disposed at the corresponding two positions, an amount of the bending may not be detected at a position other than the two positions. Accordingly, in the related art, the skew correction is applied while assuming that it is linearly inclined.

SUMMARY OF THE INVENTION

According to an aspect of the present invention, there is provided an image forming apparatus including an exposure unit configured to expose a photoreceptor based on image data; a developing unit configured to develop the photoreceptor by a developer; a transfer unit configured to transfer an image formed on the photoreceptor by the developer onto a recording medium; a fixing unit configured to fix the image on the recording medium; an image data storage unit configured to store the image data in units of a line in a main scanning direction; an inclination amount detection unit configured to detect a first inclination amount of a first portion of the image data relative to the main scanning direction, wherein the first portion of the image data spans from one end to the other end in the main scanning direction; an inclination amount storage unit configured to store, when gradient of the image data changes at a point in the main scanning direction, a second inclination amount of a second portion of the image data relative to the main scanning direction, wherein the second portion of the image data spans from the one end in the main scanning direction to the point, or the second portion of the image data spans from the other end in the main scanning direction to the point; a correction amount calculation unit configured to calculate correction amounts being associated with the main scanning direction, wherein the correction amount calculation unit is configured to calculate the correction amounts by switching, at the point in the main scanning direction as a boundary, whether the first inclination amount is increased by the second inclination amount or the first inclination amount is decreased by the second inclination amount; and an image correction unit configured to correct the image, wherein, when the image data is read out from the image data storage unit in the units of the line in the main scanning direction, the image correction unit corrects the image by adjusting timing to read out the image data based on the correction amounts.

According to another aspect of the present invention, there is provided an image correction method of an image forming apparatus, wherein the image forming apparatus includes an exposure unit configured to expose a photoreceptor based on image data; a developing unit configured to develop the photoreceptor by a developer; a transfer unit configured to transfer an image formed on the photoreceptor by the developer onto a recording medium; a fixing unit configured to fix the image on the recording medium; and an image data storage unit configured to store the image data in units of line in a main scanning direction. The method includes a step, by an inclination amount detection unit, of detecting a first inclination amount of a first portion of the image data relative to the main scanning direction, wherein the first portion of the image data spans from one end to the other end in the main scanning direction; a step, by a correction amount calculation unit, of calculating correction amounts being associated with the main scanning direction, by referring to an inclination amount storage unit configured to store, when a gradient of the image data changes to an opposite direction at a point in the main scanning direction, a second inclination amount of a second portion of the image data relative to the main scanning direction, wherein the second portion of the image data spans from the one end in the main scanning direction to the point, or the second portion of the image data spans from the other end in the main scanning direction to the point, and by switching, at the point in the main scanning direction as a boundary, whether the first inclination amount is increased by the second inclination amount or the first inclination amount is decreased by the second inclination amount; and a step, by an image correction unit, of correcting the image, wherein, when the image data is read out from the image data storage unit in the units of the line in the main scanning direction, the image correction unit corrects the image by adjusting timing to read out the image data based on the correction amounts.

According to an embodiment of the present invention, there can be provided an image forming apparatus that can reduce the bending, which is not observed by the optical units and which is caused by shifting of the exposure unit.

Other objects, features and advantages of the present invention will become more apparent from the following detailed description when read in conjunction with the accompanying drawings.

BRIEF DESCRIPTION OF THE DRAWINGS

FIG. 6 is a diagram showing an example of the color deviation correcting pattern;

FIGS. 7A and 7B are diagrams illustrating color deviation correction;

FIG. 8 is a diagram illustrating an example of the skew correction using the color deviation correcting pattern;

FIGS. 10A, 10B, 10C, and 10D are diagrams schematically showing an example of an effect of the skew correction;

FIG. 12 is a diagram showing an example of a bending correction amount table;

DETAILED DESCRIPTION OF THE PREFERRED EMBODIMENTS

Hereinafter, an embodiment for implementing the present invention is explained by referring to the accompanying drawings. However, the technical scope of the present invention is not limited to the embodiment.

Figure 1:
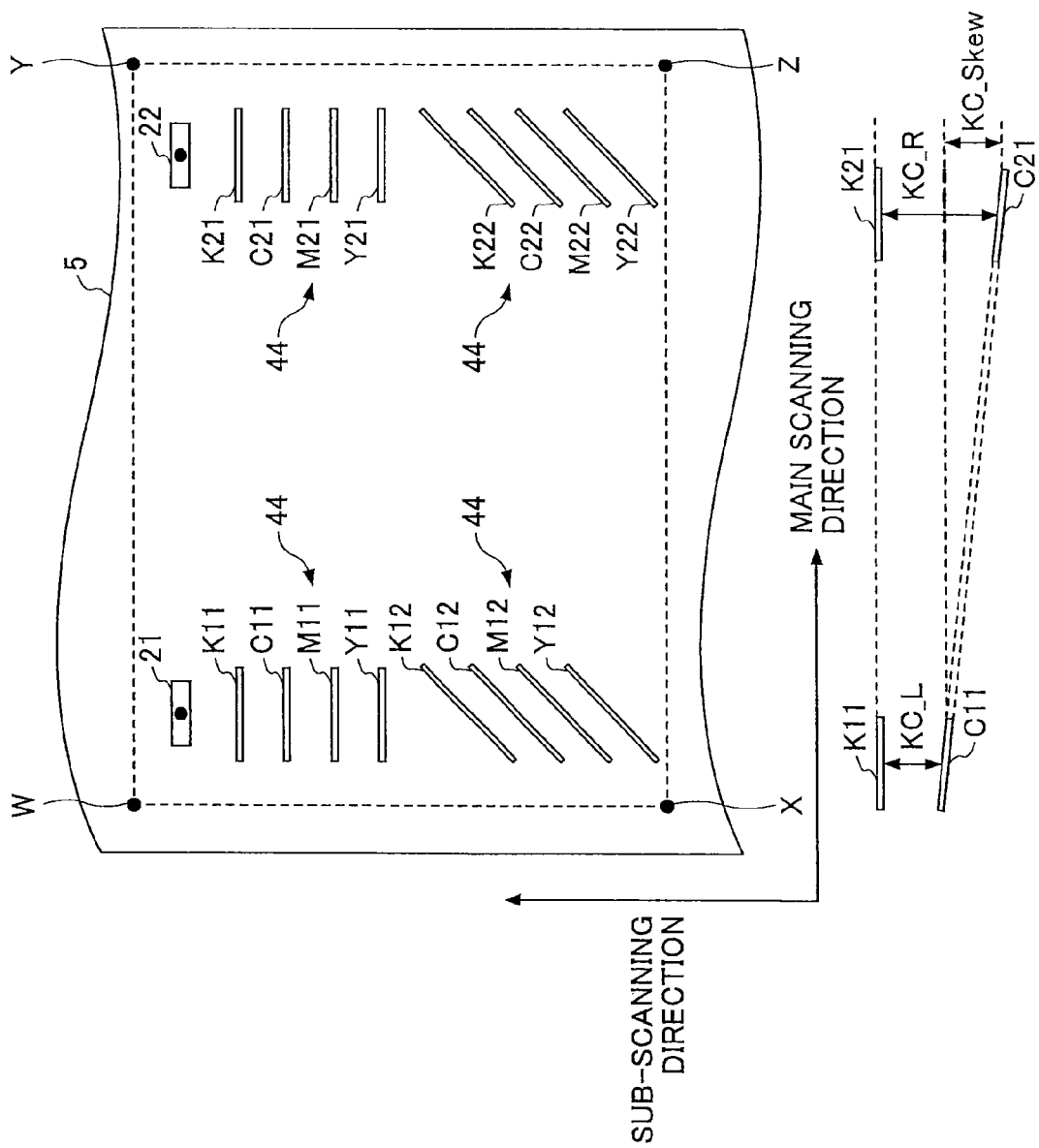
FIG. 1 is a diagram illustrating an example of a color deviation correcting pattern.
Figure 2:
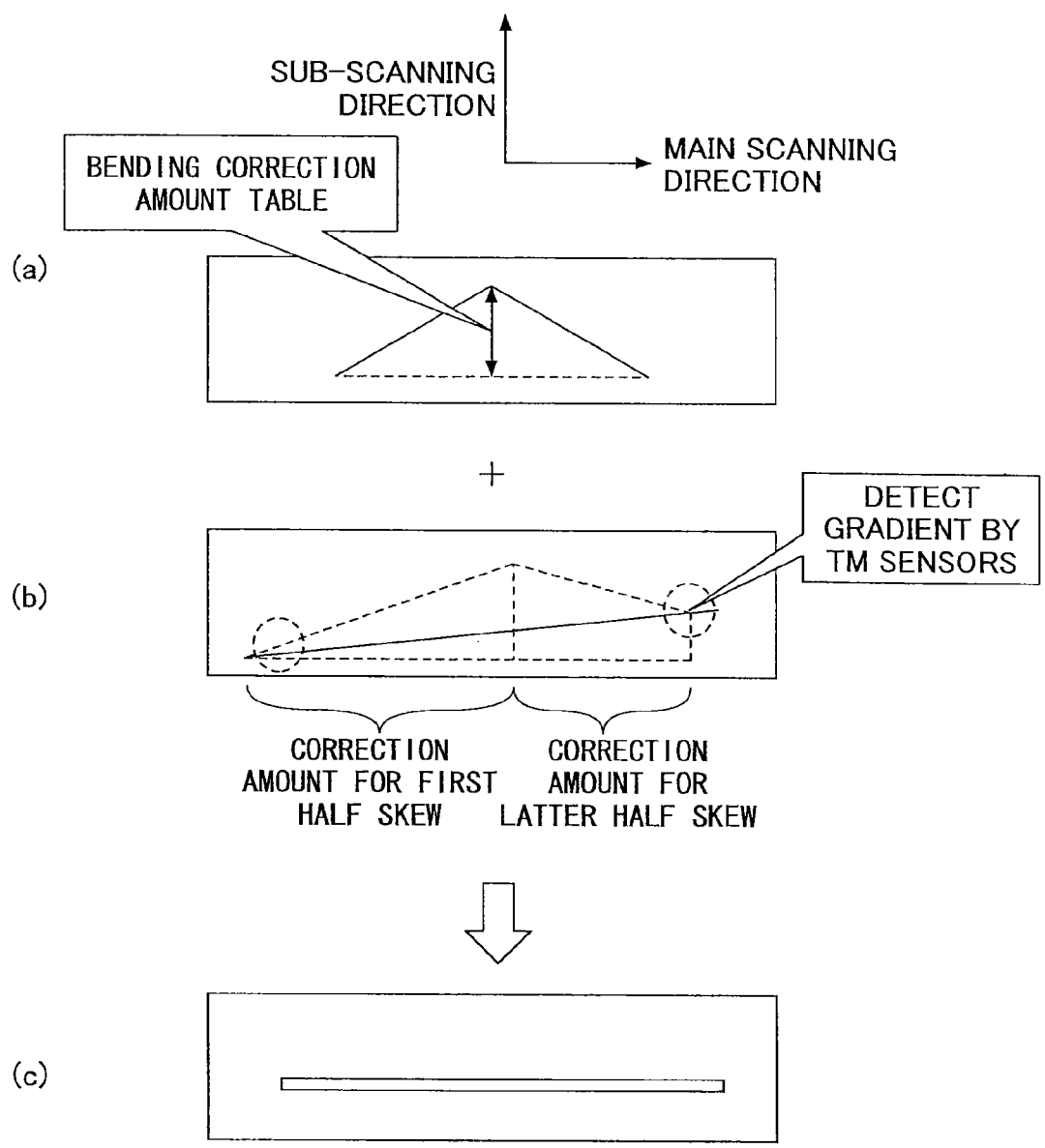
FIG. 2 is a diagram illustrating schematic characteristics of skew correction executed by an image forming apparatus according to an embodiment.

FIG. 2 is a diagram illustrating schematic characteristics of skew correction executed by the image forming apparatus according to the embodiment. (1): The image forming apparatus includes a bending correction amount table in advance. The bending correction amount table is a table in which a value of correction amount for correcting the bending is registered for each of the colors. Here, the value of correction amount is obtained, for example, by a developer working for a manufacturer by measuring an extent of bending of an LED array around a center in a main scanning direction. In FIG. 2, (a) schematically shows a bending correction amount and a direction of the correction. (2): Similar to the case of the related art, the image forming apparatus includes optical sensors disposed at corresponding end portions in the main scanning direction. The optical sensors face a transfer belt. The image forming apparatus is capable of detecting a gradient of a straight line. The image forming apparatus obtains a correction amount for a first half portion and a correction amount for a latter half portion from a detection result. That is because a bending correction amount for a center portion is registered in the bending correction table. Since the gradient of the bending changes to an opposite direction at the center, by adding the bending correction amount of the bending correction table to a correction amount for a first half portion, and by subtracting the bending correction amount of the bending correction table from the correction amount for a latter half portion, the correction amounts for correcting both the gradient and bending can be obtained. In FIG. 2, (b) shows the correction amounts for correcting both the gradient and bending. It is assumed that the horizontal line which is not corrected is bent opposite to that of (a) of FIG. 2. (3): By applying the correction of (b) of FIG. 2 depending on a position in the main scanning direction, skew correction can be applied to the first half portion and the latter half portion, while using corresponding different gradients. Thus, the skew correction can be executed while including a bending component. In FIG. 2, (c) shows a printing result of printing a horizontal line. The horizontal line is printed as a line which is horizontal.

In the image forming apparatus according to the embodiment, even if a gradient of the exposure unit exists which includes bending, which may not be observed by the optical sensors, by using the bending correction amount table, the bending can be corrected while executing the skew correction.

Configuration Example

Figure 3:
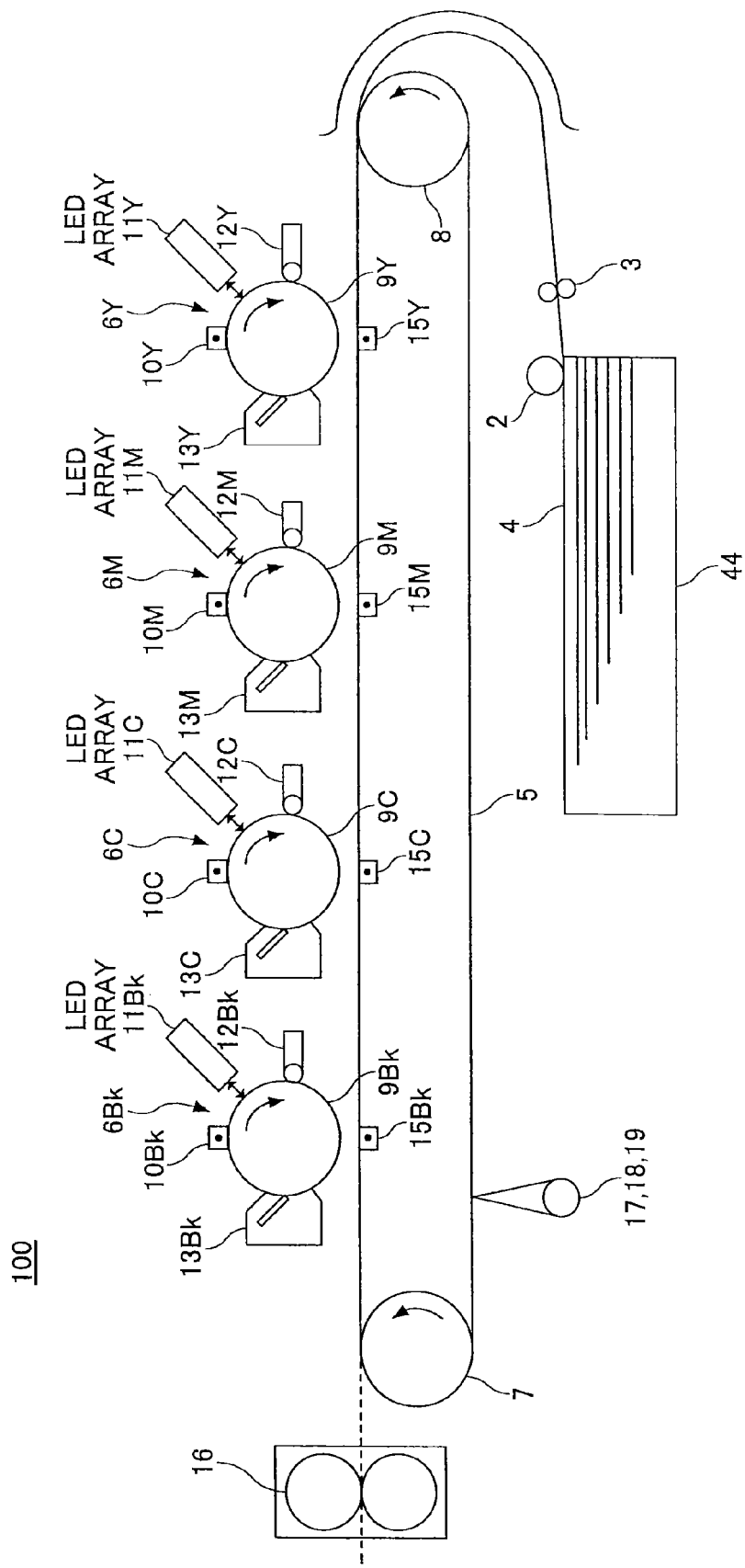
FIG. 3 is a diagram showing an example of a configuration of the image forming apparatus.

FIG. 3 is a diagram showing an example of a configuration of the image forming apparatus. The image forming apparatus 100 is a so-called "tandem-type image forming apparatus," which has a configuration such that image forming units 6Y, 6M, 6C, and 6Bk for corresponding colors of yellow, magenta, cyan, and black are arranged along a conveyance belt, which is a conveyance unit having an endless shape. In addition, an image forming apparatus according to a four-cycle method can be considered (in which toner images in corresponding four colors are sequentially transferred by superposing them, and subsequently the four-color toner image on the intermediate transfer body is transferred onto a paper sheet at once). The configuration which is shown in FIG. 3 is not for limiting a method.

The paper feed tray 44 accommodates paper sheets 4 (the sheet is not limited to the paper sheet 4, and it suffices if it is a recording medium such as a film-like sheet material). The paper sheet 4 is fed and separated by a paper feed roller 2 and a separation roller 3 from the paper feed tray 44, and the paper sheet 4 is conveyed by the conveyance belt 5. The paper sheet 4 is attracted and attached to the conveyance belt 5 by an electrostatic force and/or negative pressure.

A plurality of image forming units (electrophotographic image processing units) is arranged along a conveyance direction of the conveyance belt 5 from an upstream side. Here, the image forming units 6Y, 6M, 6C, and 6Bk are arranged in this order from the upstream side along the conveyance direction of the conveyance belt 5. These image forming units 6Y, 6M, 6C, and 6Bk have the same internal configurations, except that they form toner image in corresponding different colors. The image forming unit 6Bk forms a black image; the image forming unit 6C forms a cyan image; the image forming unit 6M forms a magenta image; and the image forming unit 6Y forms a yellow image. In the explanation below, the image forming unit 6Y is concretely explained. The same explanation may be applied to the other image forming units 6M, 6C, and 6Bk. The explanations of omitted elements included in the image forming unit 6M, 6C, and 6Bk are achieved by attaching the corresponding reference symbols M, C, and Bk to the corresponding elements of the image forming unit 6Y, instead of the reference symbol Y.

The conveyance belt 5 is an endless belt, which is wound around a driving roller 7 and a driven roller 8. The driving roller 7 is rotationally driven. The driving roller 7 is rotationally driven by a driving motor (not shown), and the driving motor, the driving roller 7 and the driven roller 8 function as a driving unit for moving the conveyance belt 5, which is the conveyance unit having the endless shape.

The paper sheet 4 which is attracted and attached to the conveyance belt 5 is transmitted to the first image forming apparatus 6Y by the rotationally driven conveyance belt 5, and a yellow toner image is transferred at this position. The image forming unit 6Y includes a photosensitive drum 9Y as a photoreceptor; a charging unit 10Y which is disposed around the photosensitive drum 9Y; a LED array 11Y; a developing unit 12Y; a photoreceptor cleaner 13Y; a static eliminator (not shown); and the like. The LED arrays 11Y, 11M, 11C, and 11Bk are exposing units for exposing the corresponding image forming units 6Y, 6M, 6C, and 6Bk.

An outer circumferential surface of the photosensitive drum 9Y is uniformly charged by the charging unit 10Y in the dark, and the outer circumferential surface of the photosensitive drum 9Y is irradiated by irradiation light, which corresponds to the yellow image, from the LED array 11, and thereby an electrostatic latent image is formed. The developing unit 12Y forms the yellow toner image on the photosensitive drum 9Y by visualizing the electrostatic latent image by yellow toner. The toner image is transferred onto the paper sheet 4 by an effect of the electrostatic force of a transfer unit 15Y at a position at which the photosensitive drum 9Y contacts the paper sheet 4 on the conveyance belt 5 (a transfer position). By the transfer, the image is formed with the yellow toner on the paper sheet 4. Subsequent to completion of the transfer of the toner image, the photoreceptor cleaner 13 removes the unnecessary toner which is remaining on the outer peripheral surface of the photosensitive drum 9Y. Subsequently, the photosensitive drum 9Y is destaticized by the static eliminator, and waits for the next image formation.

Subsequent to transferring the yellow toner image at the image forming unit 6Y, the paper sheet 4 is transferred to the next image forming unit 6M by the conveyance belt 5. At the image forming unit 6M, a magenta toner image is formed on the photosensitive drum 9M by a process which is the same as the image forming process at the image forming unit 6Y, and the magenta toner image is superposed and transferred onto the yellow image, which is formed on the paper sheet 4. Subsequently, the paper sheet 4 is transferred to the image forming units 6C and 6Bk, and a cyan toner image formed on the photo sensitive drum 9C and a black toner image formed on the photosensitive drum 9Bk are superposed and transferred onto the paper sheet 4 by similar processing. In this manner, a full-color image is formed on the paper sheet 4. Subsequent to the formation of the superposed full-color image, the paper sheet 4 is removed from the transfer belt 5. Then, the image is fixed by a fixing unit, and the paper sheet 4 is ejected outside the image forming apparatus 100.

Figure 4:
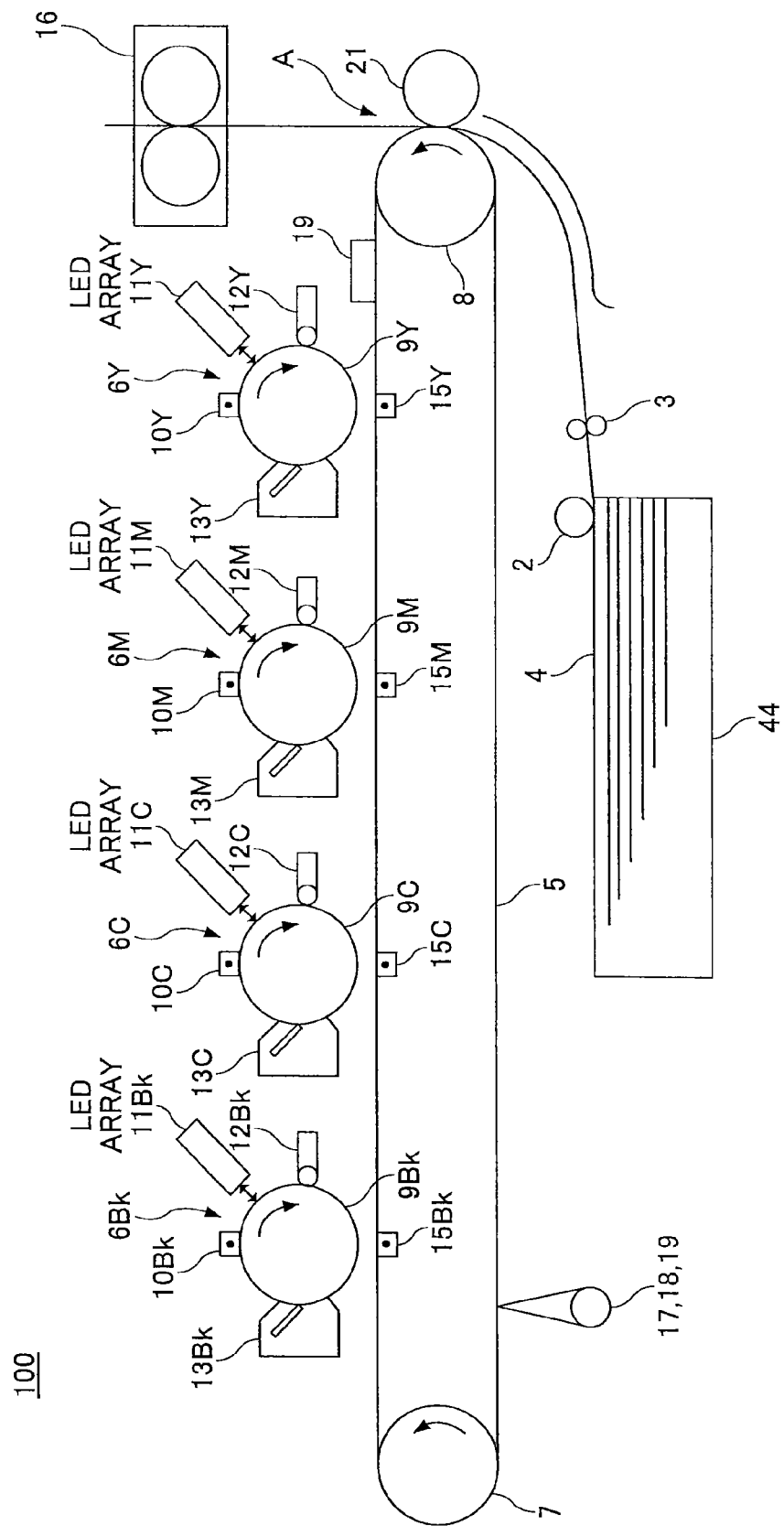
FIG. 4 is a diagram showing another example of the configuration of the image forming apparatus.

FIG. 4 is a diagram showing another example of the configuration of the image forming apparatus 100. In FIG. 3, the toner image is directly formed on the paper sheet 4. In FIG. 4, the toner image is temporarily formed on an intermediate transfer belt (the conveyance belt 5). Namely, the conveyance belt 5 as the conveyance unit having the endless shape is not a conveyance belt, but it is an intermediate transfer belt. The intermediate transfer belt is an endless belt which is wound around the driving roller 7 and the driven roller 8.

The toner images in the corresponding colors are transferred onto the intermediate transfer belt at positions at which the corresponding photosensitive drums 9Y, 9M, 9C, and 9Bk contact the intermediate transfer belt (primary transfer positions) by the operation of the corresponding transfer units 15Y, 15M, 15C, and 15Bk. By the transfer, a full-color image, which is formed by superposing the toner images in the corresponding color, is formed on the intermediate transfer belt.

During the image formation, the paper sheets 4 which are accommodated in the paper feed tray 44 are sequentially sent from the paper sheet 4 at the upper-most position, and the full-color toner image is transferred onto the paper sheet 4 at a secondary transfer position (the position A in FIG. 4), where the intermediate transfer belt contacts the paper sheet 4. The secondary transfer roller 21 is disposed at the secondary transfer position. In addition to the electrostatic force, by pressing the paper sheet 4 toward the intermediate transfer belt by the secondary transfer roller 21, transfer efficiency can be improved. The secondary transfer roller 21 may always contact the intermediate transfer belt. Alternatively, the secondary transfer roller 21 may contact the intermediate transfer belt only during the secondary transfer by a contact/separation unit.

Figure 5:
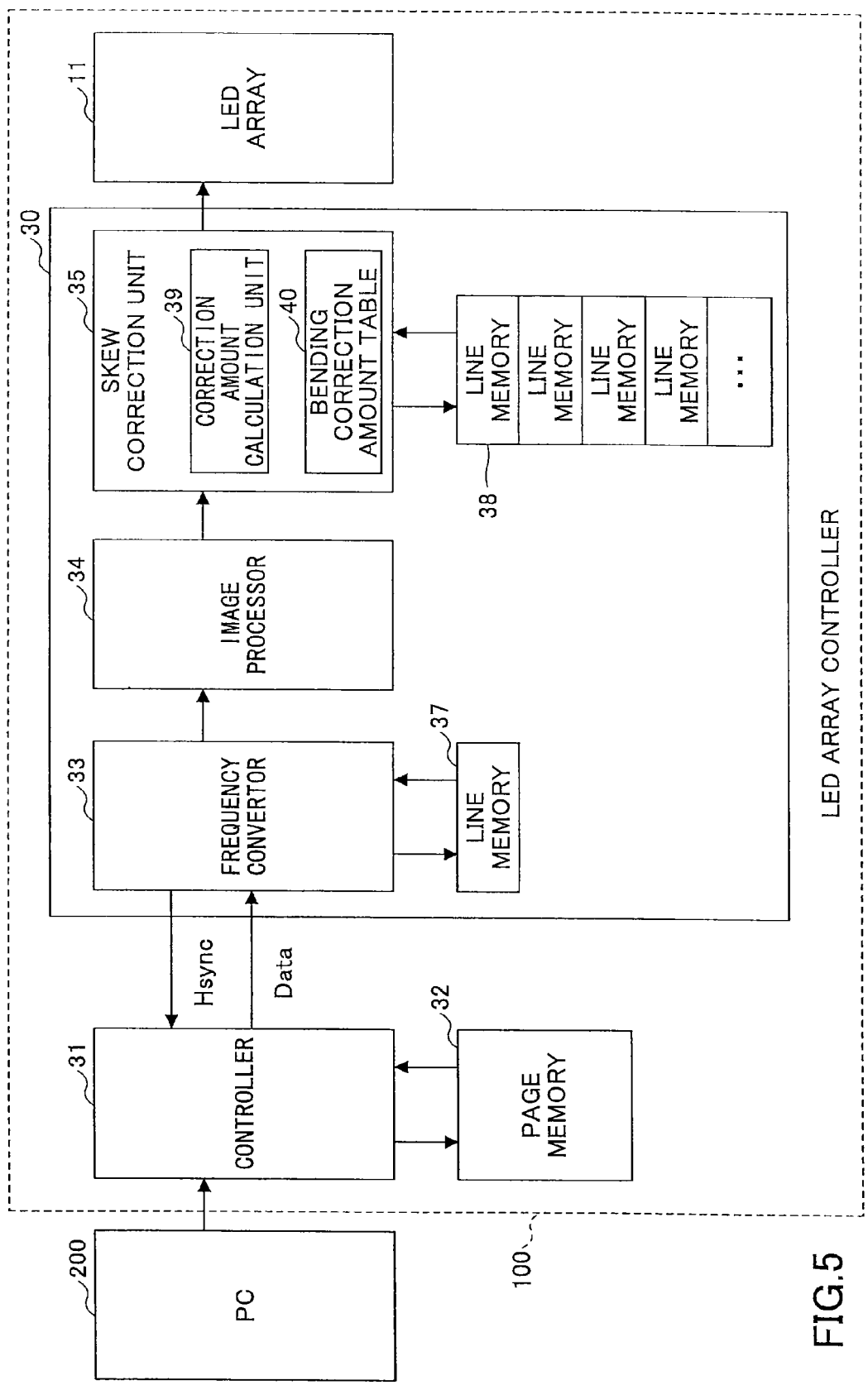
FIG. 5 is a block diagram of an example of a LED array controller that controls a LED array.

FIG. 5 is a block diagram showing an example of a LED array controller 30 which controls the LED array 11. The image forming apparatus 100 includes a controller 31; the LED array controller 30; and the LED array 11. The image forming apparatus 100 is connected to a Personal Computer (PC) 200 through a network. The network is a Local Area Network (LAN), for example. The LAN may be a wired LAN, or a part or all the network may be formed of a wireless LAN. The network includes a configuration in which the PC is connected with the image forming apparatus 100 through a USB cable or a LAN cable, so that they are in a one-to-one correspondence.

The image forming apparatus 100 may include a scanner function. In this case, since the image forming apparatus 100 can operate as a copier, which reads a document by the scanner function and which prints an image on a paper sheet, it is not necessary that the image forming apparatus 100 is connected to the PC 200. Similarly, when the image forming apparatus 100 has a facsimile function, it is not necessary that the image forming apparatus 100 is connected to the PC 200.

When the PC 200 transmits print data together with a command for printing the print data, the controller 31 converts the print data into bit map data, and the controller 31 stores the bit map data in a page memory 32. The LED array controller 30 outputs a horizontal synchronization (HSYNC) signal to the controller 31, and the controller 31 transmits one line of the bit map data to the LED array controller 30, while adjusting the transmission timing of transmitting the one line of the bit map data to the output timing of outputting the HSYNC signal. The transfer format includes an image forming method in which different formats can be processed for the corresponding different channels (CHs), and an image forming method in which only a common format is processed among the CHs.

Since an operational clock frequency of the LED array controller 30 is different from an operational clock frequency of the controller 31, the LED array controller 30 temporarily stores the image data in a line memory 37, and a frequency convertor 33 performs frequency conversion in which the bit map data is read based on the operational clock of the LED array controller 30.

Subsequently, the image processor 34 performs image processing such as addition of an internal pattern (a color deviation correcting pattern, an image which is not included in the print data such as a pattern for stamp printing or a pattern for design printing, line patterns of CMYK which are for tone correction), or a trimming process, and the image processor 34 passes the bit map data to the skew correction unit 35. Here, if a process, such as a jaggy correction, which may require a line memory, is to be performed during the image processing, the image forming apparatus 100 may include a line memory for the image processing.

The bit map data is stored in a plurality of line memories 38, which is for skew correction. When the bit map data is read out from the line memories 38, the skew correction unit 35 performs the skew correction process by shifting the line memory 38 to be read in the sub-scanning direction at a point in the main scanning direction, which is determined as described later. In the embodiment, the skew correction unit 35 includes a correction amount calculation unit 39, and the skew correction unit 35 calculates a correction amount for the skew correction, which includes correction of the bending, by referring to the bending correction amount table 40.

During the skew correction, by setting a line period for reading (a period for reading one line) to be 1/N times as much as a line period for writing (a period for writing one line), data can be read N-times from one line memory 38 (N is a natural number). This process is referred to as a "density-doubling process." The resolution of the skew corrected data in the sub-scanning direction is N times as much as the resolution of the data in the sub-scanning direction at the time of writing the data.

The LED array controller 30 performs light emission control of the LED array 11 in accordance with the skew corrected image data. Namely, by controlling a light emitting time period (light intensity) depending on density gradation, gradation expression is enabled. Depending on a type of the LED array 11, a data array may be converted in accordance with a wiring of the LED array 11. When the array conversion is performed over one line, subsequent to the skew correction, the line memories 38 are arranged again; the array converted data is written in the line memories 38; and after that the data is read.

[Color Deviation Correcting Pattern]

FIG. 6 is a diagram showing an example of a color deviation correcting pattern. In FIG. 6, the vertical direction corresponds to the main scanning direction, and the horizontal direction corresponds to the sub-scanning direction. The left side in the horizontal direction is the downstream side in the sub-scanning direction.

In the color deviation correcting pattern, one set includes straight lines in the corresponding four colors of Y, Bk, M, and C; another one set includes oblique lines in the corresponding four colors of Y, Bk, M, and C. In the color deviation correcting pattern, one combination of the pattern sequences includes eight lines of pattern sequences, which are four straight lines and four oblique lines. Each of the oblique line patterns is a line slanted upward to the right, which has a tilt angle of 45 degrees with respect to the sub-scanning direction. By forming a plurality of combinations of the color deviation correcting patterns in the sub-scanning direction, errors in positions of forming the color deviation correction patterns and errors in reading the color deviation correction patterns can be reduced. In this manner, accuracy of the color deviation correction is improved. At the front position of the pattern, two patterns are disposed, which are for correcting the detection timing (which are two yellow lines, in FIG. 6).

For the skew correction, two Toner Mark (TM) sensors 17 and 19 are disposed at corresponding end portions in the main scanning direction, while the two TM sensors 17 and 19 are separated from each other. Accordingly, the pattern sequences of the color deviation correcting patterns are disposed at the positions facing the corresponding TM sensors 17 and 19.

The TM sensors 17 and 19 detect the corresponding detection timing correcting patterns immediately before detecting the pattern sets. In this manner, the TM sensors 17 and 19 detect time periods from the start of the pattern formation (exposure) until the detection timing correcting patterns reach the corresponding positions of the TM sensors 17 and 19, and thereby deviations from theoretical values are calculated and/or corrected. With this, the pattern sets can be detected at corresponding suitable timings. By the detection result of the detection timing correcting patterns, a leading edge of the paper sheet and writing start positions of the corresponding colors can be corrected. The shift of the writing start position may be generated by a deviation amount which is caused by a tolerance of an incident angle of LED/laser light onto the photosensitive drum 9, or a deviation amount which is caused by variation of the conveyance speed of the conveyance belt 5. Since this shift occurs in the detection result of the detection timing correcting patterns, by detecting the detection timing correcting patterns, the writing start positions can be corrected.

The line Y of the first set can be used as the detection timing correcting pattern. In this case, the conveyance distance until the TM sensors 17 and 19 detect the detection timing correcting patterns is greater than that of the case in which the two Y lines at the front positions are used as the detection timing correcting patterns. Accordingly, the effect of the deviation amount becomes significant, which is caused by the variation of the conveyance speed of the conveyance belt 5. Thus, the correction effect becomes significant.

Further, when the Bk lines are used as the detection timing correcting patterns, the detection errors are reduced, and the correction precision is improved.

The detection timing correcting pattern may be one set of the horizontal lines in Bk, C, M, and Y (i.e., the two sets of the horizontal lines corresponding to the two TM sensors 17 and 19). The detection timing correcting pattern may be one set of the oblique lines of the color deviation correcting pattern (which is one of two sets of the oblique line patterns corresponding to the two TM sensors 17 and 19). In this case, it is preferable that the detection timing correcting pattern be the first set.

FIG. 7A is a diagram illustrating an example of the color deviation correction in the sub-scanning direction. It is assumed that the line Y is used as a reference line. The TM sensor 17 detects a center of the corresponding line Y (which is the center between the left and right edges of the line Y). Similarly, the TM sensor 19 detects a center of the corresponding line Y. Each of the TM sensors 17 and 19 measures a time period $T_{Bk}-1$ from detecting the corresponding line Y until detecting the corresponding line Bk; a time period $T_M-1$ from detecting the corresponding line Y until detecting the corresponding line M; and a time period $T_C-1$ from detecting the corresponding line Y until detecting the corresponding line C. These measurements are performed for each set of the straight lines. The exposure timings in the sub-scanning direction in the colors of Bk, M, and C are calculated and/or corrected by comparing average values of the time periods $T_{Bk}-1$, $T_M-1$, and $T_C-1$ with corresponding theoretical values.

FIG. 7B is a diagram illustrating an example of the color deviation correction in the main scanning direction. Each of the TM sensors 17 and 19 measures a time period $T_{Bk}-2$ from detecting the corresponding line Y until detecting the corresponding line Bk; a time period $T_M-2$ from detecting the corresponding line Y until detecting the corresponding line M; and a time period $T_C-2$ from detecting the corresponding line Y until detecting the corresponding line C. Since the oblique line is tilted by 45 degrees with respect to the sub-scanning direction, if the position of the oblique line shifts by a distance d in the main scanning direction, the position of the oblique line also shifts by the distance d in the sub-scanning direction. These measurements are performed for each set of the oblique lines. The exposure timings in the main scanning direction in the colors of Bk, M, and C are calculated and/or corrected by comparing average values of the time periods $T_{Bk}-2$, $T_M-2$, and $T_C-2$ with corresponding theoretical values.

[Skew Correction]

Figure 9:
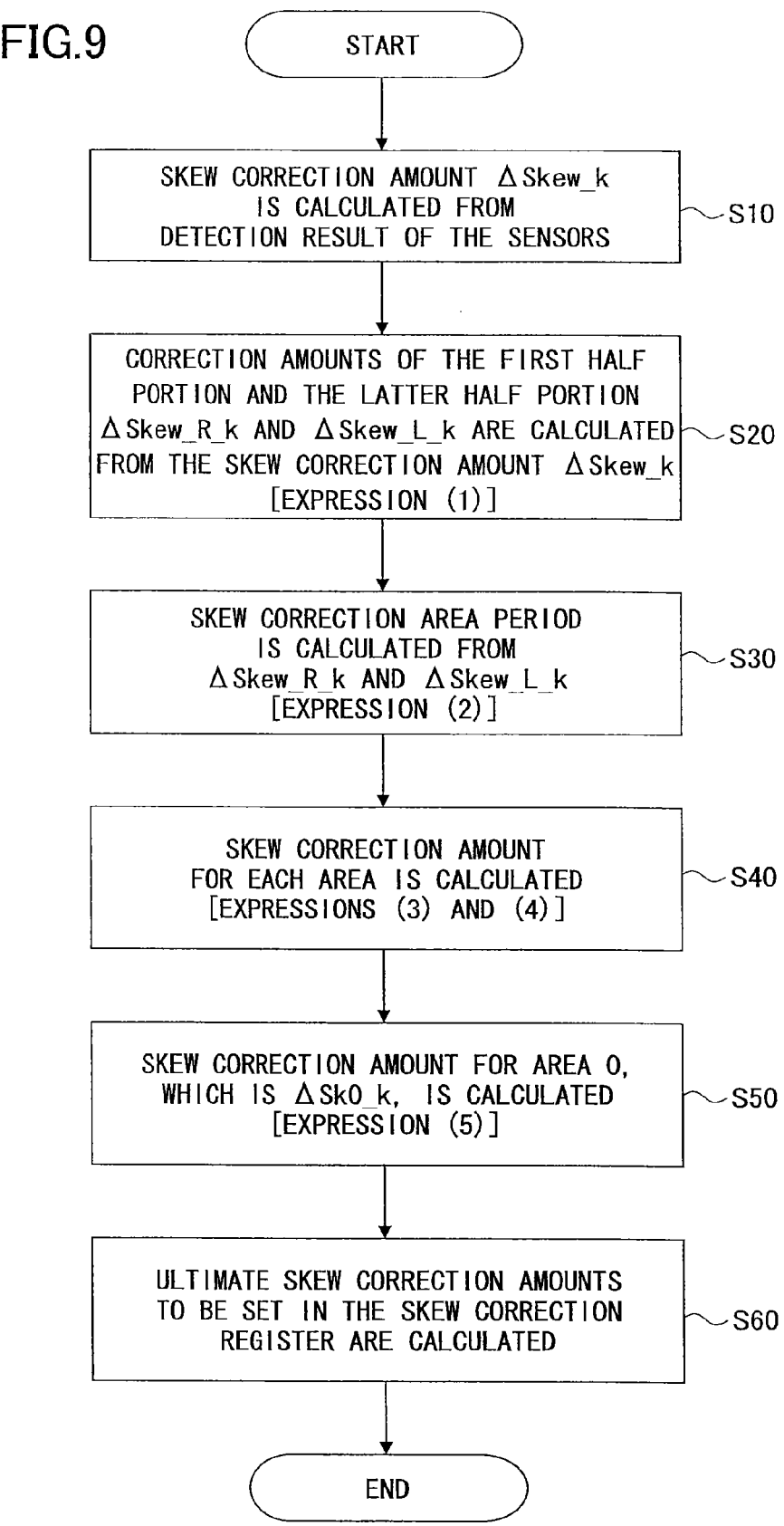
FIG. 9 is a flowchart illustrating an example of a calculation procedure of a skew correction amount.

There is explained the skew correction using the color deviation correcting pattern by referring to FIGS. 8 and 9. FIG. 9 is a flow chart illustrating an example of a procedure of calculating the skew correction amount. The procedure of FIG. 9 does not address the bending correction. However, as described later, a basic flow of the skew correction including the bending correction is the same as the procedure of FIG. 9.

In FIG. 8, the horizontal direction is the main scanning direction. There is a shift between a timing of detecting the line Bk of the straight line pattern by the TM sensor 17 and a timing of detecting the line Bk of the straight line pattern by the TM sensor 19. This shift is referred to as a skew correction amount $\Delta Skew\_k$. In FIG. 8, $\Delta Skew\_k$ is indicated in terms of a distance. However, the distance and time are mutually compatible. The skew correction amounts for the line Y, the line C, and the line M are not shown in FIG. 8. However, the skew correction amounts for the line Y, the line C, and the line M are also measured.

In the embodiment, an example case is explained in which one line in the main scanning direction is divided into 144 pieces. The number of the division may be determined depending on the maximum expected skew amount, resolution, or the like. The division into 144 pieces is for exemplifying purpose only. Further, in the embodiment, the one line in the main scanning direction is divided into two pieces at the center position, and the left portion in the main scanning direction is attached to a value of L, and the right portion in the main scanning direction is attached to a value of R.

For the skew correction, a rectangular region elongated in the main scanning direction is divided into a plurality of areas, and the gradient is corrected for each of the areas. The correction amount for each of the areas is +1 line or −1 line (i.e., advance by one line in the sub-scanning direction or backspace one line in the sub-scanning direction). In each or the areas, the skew correction is executed (+1 or −1), or the skew correction is not executed (0), depending on a skew correction area period (depending on the number of lines in the area). As depicted in FIG. 8, area numbers are assigned to the corresponding areas in an ascending order (from 0 to 143) in the main scanning direction. As for the case of $\Delta Skew\_k$ in FIG. 8, during the skew correction in which printing is performed while delaying printing on the right side in the main scanning direction compared to that on the left side in the main scanning direction, the skew correction of +1 line is executed in each of the skew correction area periods. In the skew correction in which printing is performed while delaying printing on the left side in the main scanning direction compared to that on the right side in the main scanning direction, the skew correction of −1 line is executed for each of the skew correction areas.

In FIG. 8, the skew correction area period is three areas. Thus, the skew correction is not executed in the area 1 and area 2. The skew correction is executed in the area 3. The greater the skew correction amount is, the smaller the skew correction area period becomes. The smaller the skew correction amount is, the greater the skew correction area period becomes.

As shown in FIG. 9, the correction amount calculation unit 39 calculates the skew correction amount $\Delta Skew\_k$ from the detection result by the TM sensors 17 and 19 (S10).

The correction amount calculation unit 39 calculates, based on the skew correction amount $\Delta Skew\_k$ which is calculated from the detection result by the TM sensors 17 and 19, the correction amount $\Delta Skew\_R\_k$ for the first half of the areas in the main scanning direction, and the correction amount $\Delta Skew\_L\_k$ for the latter half of the areas in the main scanning direction (S20).

$$\Delta Skew\_R\_k = \Delta Skew\_k/2$$

$$\Delta Skew\_L\_k = \Delta Skew\_k/2 \qquad (1)$$

Next, the skew correction area periods $\Delta Skew\_cyc\_R\_k$, and $\Delta Skew\_cyc\_L\_k$ are obtained (S30).

$$\Delta Skew\_sys\_R\_k = 72/(abs\{\Delta Skew\_R\_k\}+1)$$

$$\Delta Skew\_sys\_L\_k = 72/(abs\{\Delta Skew\_L\_k\}+1) \qquad (2)$$

Next, the correction amount calculation unit 39 calculates skew correction amounts for the corresponding areas (S40). In the following, x and y are natural numbers in a range from 1 to 71 that specify the corresponding areas. Further, i and n are natural numbers in the range from 1 to 71. The function round {a, b} is a function which rounds a numerical value "a"

to a specified number of digits "b" (a first decimal place is indicated by "0," and a second decimal place is indicated by "1").

$$x = \text{round}\{\Delta\text{Skew\_cyc\_}R\_k * i, 0\}$$

$$\Delta\text{Skew}x\_k = (\Delta\text{Skew}\_R\_k)/\text{abs}\{\Delta\text{Skew}\_R\_k\}$$

$$\Delta\text{Skew}y\_k = 0 (y=n, \text{ and } y \neq x) \quad (3)$$

For example, if ΔSkew_cyc_R_k is "3," ΔSkewx_k=1 or −1 at x=3, 6, 9, . . . , and 69. Further, ΔSkewy_k=0 at y other than 3, 6, 9, . . . , and 69.

Similarly, the skew correction amounts are calculated for the corresponding areas 72-143. Here, x and y are natural numbers in a range from 72 to 143 that specify the corresponding areas. Further, i and n are natural numbers in the range from 72 to 143.

Next, the correction amount calculation unit 39 obtains peak values among the skew correction amounts of all the areas, and the correction amount calculation unit 39 calculates the skew correction amount ΔSk0_k for the area 0 (S50). This is for executing the skew correction depending on the direction of the gradient.

First, the peak values of the skew correction amounts are calculated.

$$\Delta Sk1\_k = 0$$

$$\Delta Sk2\_k = \Delta Sk1\_k + \Delta Skew2\_k$$

$$\Delta Sk3\_k = \Delta Sk2\_k + \Delta Skew3\_k$$

$$\Delta Sk4\_k = \Delta Sk3\_k + \Delta Skew4\_k$$

$$\Delta Sk5\_k = \Delta Sk4\_k + \Delta Skew5\_k$$

$$\Delta Sk6\_k = \Delta Sk5\_k + \Delta Skew6\_k$$

$$\Delta Sk7\_k = \Delta Sk6\_k + \Delta Skew7\_k$$

$$\vdots$$

$$\Delta Sk142\_k = \Delta Sk141\_k + \Delta Skew142\_k$$

$$\Delta Sk143\_k = \Delta Sk142\_k + \Delta Skew143\_k$$

Thus, the positive peak value ΔSk_max_k, and the negative peak value ΔSk_min_k are obtained as described below.

$$\Delta\text{Sk\_max\_k} = $$
$$\max\{\Delta Sk2\_k, \Delta Sk3\_k, \Delta Sk4\_k, \Delta Sk5\_k, \ldots, \Delta Sk142\_k, \Delta Sk143\_k\}$$

$$\Delta\text{Sk\_min\_k} = $$
$$\min\{\Delta Sk2\_k, \Delta Sk3\_k, \Delta Sk4\_k, \Delta Sk5\_k, \ldots, \Delta Sk142\_k, \Delta Sk143\_k\}$$

The skew correction amount ΔSk0_k for the area 0 is set as described below.

$$\Delta Sk0\_k = \text{abs}\{\Delta\text{Sk\_min}\_k\} \quad (5)$$

Here, the absolute value is calculated so as to include an offset when ΔSk_min_k is less than zero. As shown in FIG. 8, when the direction of the correction is the positive direction (+1), ΔSk_min_k is ΔSk2_k=0 (when the skew correction area period is three areas). When the direction of the correction is opposite to that of FIG. 8, namely, when the direction of the correction is negative (−1), ΔSk_min_k is ΔSk143_k, which is equal to the number of "−1" included in from ΔSk1_k to ΔSk143_k (when the skew correction area period is 3 areas, ΔSk_min_k is −48). Accordingly, for the skew correction in which printing is performed while delaying printing on the right side compared to that on the left side, such as shown in FIG. 8, the skew correction is not executed for the area 0, and the skew correction of the +1 line is executed for each skew correction area period. For the skew correction in which printing is performed while delaying printing on the left side compared to that on the right side, the largest skew correction amount in the positive direction is applied to the area 0 (the printing on the area 0 is delayed), and the skew correction of the −1 line is executed for each skew correction area period. That is because, in order to advance the timing, it may be necessary that image data is already stored in the line memory 38.

Next, based on the calculated ΔSk0_k and ΔSkew#_k, the correction amount calculation unit 39 calculates ultimate skew correction amounts ΔSksft#_k and ΔSkphs#_k (S60), which are to be set in a skew correction register. Here, "#" represents an integer in a range from 0 to 143. Incidentally, "abs" represents a function that outputs an absolute value of a numerical value in the parenthesis { }. Further, "code" represents a function that outputs a sign (plus or minus) of a numerical value in the parenthesis { }. The number which is obtained by multiplying the sign of ΔSkphs#_k to ΔSksft#_k is the skew correction amount (0, +1, or −1) of the corresponding line.

$$\Delta Sksft0\_k = \Delta Sk0\_k$$

$$\Delta Sksft1\_k = 0$$

$$\Delta Skphs1\_k = 0$$

$$\Delta Sksft2\_k = \text{abs}\{\Delta Skew2\_k\}$$

$$\Delta Skphs2\_k = \text{code}\{\Delta Skew2\_k\}$$

$$\Delta Sksft3\_k = \text{abs}\{\Delta Skew3\_k\}$$

$$\Delta Skphs3\_k = \text{code}\{\Delta Skew3\_k\}$$

$$\Delta Sksft4\_k = \text{abs}\{\Delta Skew4\_k\}$$

$$\Delta Skphs4\_k = \text{code}\{\Delta Skew4\_k\}$$

$$\Delta Sksft5\_k = \text{abs}\{\Delta Skew5\_k\}$$

$$\Delta Skphs5\_k = \text{code}\{\Delta Skew5\_k\}$$

$$\vdots$$

$$\Delta Sksft142\_k = \text{abs}\{\Delta Skew142\_k\}$$

$$\Delta Skphs142\_k = \text{code}\{\Delta Skew142\_k\}$$

$$\Delta Sksft143\_k = \text{abs}\{\Delta Skew143\_k\}$$

$$\Delta Skphs143\_k = \text{code}\{\Delta Skew143\_k\}$$

Similarly, the skew correction unit 35 calculates the skew correction amounts for Cyan, Magenta, and Yellow.

FIGS. 10A-10D are diagrams schematically showing the effect of the skew correction. FIG. 10A shows an example of the printing without executing the skew correction. FIG. 10A shows a state in which the cyan (C) toner image is skewed with respect to the black (Bk) toner image.

In FIG. 10B, the skew correction area period is set to 4, the cyan image is divided into the areas in the main scanning direction, and the pixels, which are read out from the line memory 38, are shifted in the sub-scanning direction in accordance with the skew amounts. The skew is significantly reduced by shifting the pixels at every 4 pixels in the main scanning direction by the skew correction unit 35.

FIG. 10C shows an example of the skew correction, in which the resolution in the sub-scanning direction is doubled (600 dpi×1200 dpi) by the density-doubling process. Since the resolution is doubled, the skew correction area period becomes 2, and each time the skew correction unit 35 reads out two pixels in the main scanning direction, the two pixels are shifted by one pixel in the sub-scanning direction. Since the resolution in the sub-scanning direction is doubled, the deviation between the black toner image and the cyan toner image is reduced, compared to the case of FIG. 10B.

FIG. 10D shows an example of the skew correction, in which the resolution both in the sub-scanning direction and in the main scanning direction is doubled (1200 dpi×1200 dpi). Since the resolution in the main scanning direction is doubled, the skew correction area period becomes 2 (the skew correction area period is 1 with respect to the skew correction area period prior to increasing the resolution), and each time the skew correction unit 35 reads out two pixels in the main scanning direction, the two pixels are shifted by one pixel in the sub-scanning direction. Since the resolution in the main scanning direction is doubled, the deviation between the black toner image and the cyan toner image is further reduced, compared to the case of FIG. 100.

[Skew Correction Including the Bending Correction]

Figure 11A:
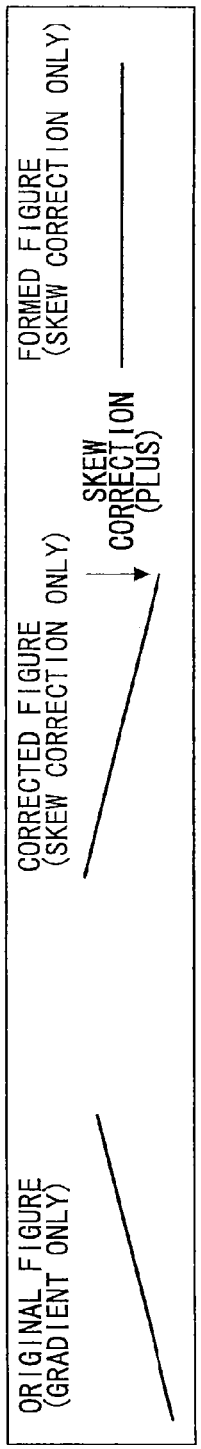
FIGS. 11A and 11B are diagrams schematically showing examples in which the skew correction is applied.
Figure 11B:
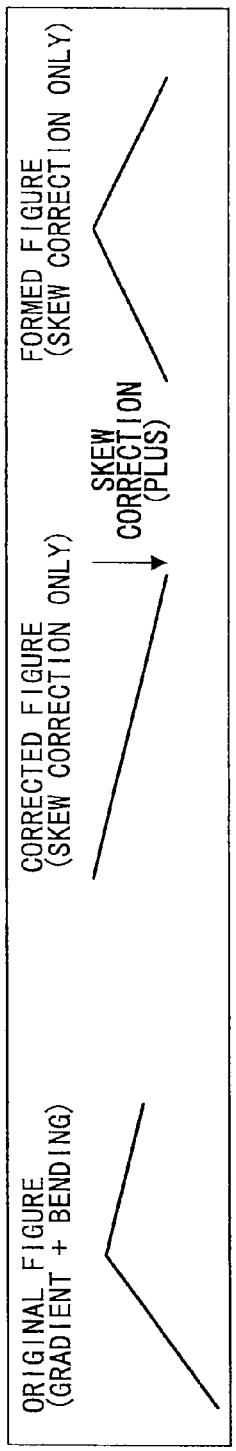
Figure 11C:
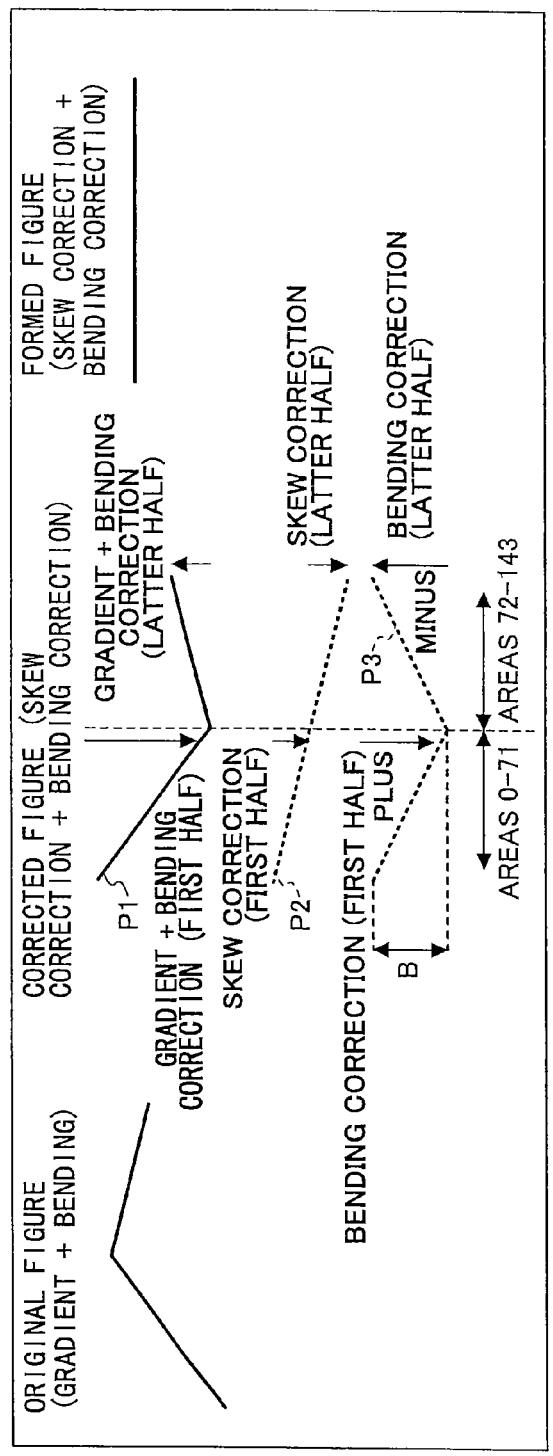
FIG. 11C is a diagram schematically showing an example in which bending correction and the skew correction are applied.

FIGS. 11A-11C are diagrams schematically illustrating an example of the skew correction including the bending correction. In each of FIGS. 11A-11C, the original image data is the horizontal line. In each of FIGS. 11A-11C, the left diagram shows an example of printing without skew correction, the center diagram shows the skew amount, and the right diagram shows an example of printing subsequent to the skew correction.

FIG. 11A shows the example of the correction for a case in which only a gradient exists in the image, and the skew correction is applied only to the gradient. By applying the positive skew correction in the main scanning direction to the line which is slanted upward to the right, the image to be printed becomes the horizontal line (the gradient component can be corrected).

FIG. 11B shows the example of the correction for a case in which both the gradient and bending exist in the image, but the skew correction is only applied to the gradient. The positive skew correction in the main scanning direction is applied to the gradient and the bending, in which the center is bent in a convex shape. In this case, the calculated skew correction amounts are not correct. Furthermore, since the positive skew correction is uniformly applied without considering the bending, the horizontal line may not be obtained (the bending component may not be corrected).

FIG. 11C shows the example of the correction for a case in which both the gradient and the bending exist in the image, and the skew correction corresponding to both the gradient and the bending is applied. P1 indicates correction amounts for correcting both the gradient and the bending; P2 indicates correction amounts for correcting only the gradient; and P3 indicates correction amounts for correcting only the bending. The skew correction is applied to the first half portion while considering the bending, and the skew correction is applied to the latter half portion while considering the bending. In this manner, the image to be printed becomes the horizontal line (the bending component can be corrected).

Specifically, the main scanning direction is divided at the center, and the correction amounts P2 for correcting the gradient are calculated, similar to the manner which is shown in FIG. 9. The correction amounts P3 indicate that the gradient is corrected by a correction amount B in the positive direction only in the first half portion, and the gradient is corrected by the correction amount B in the negative direction only in the latter half portion. In the areas 0-71, the correction amounts P2 are increased by the bending correction amounts P3 (B), and in the areas 72-143, the correction amounts P2 are decreased by the correction amount P3 (B). In this manner the correction amounts P1 are obtained which are for correcting both the gradient and the bending, while considering the bending. The skew correction can be executed in accordance with the correction amounts P1.

FIG. 12 is a diagram showing an example of the bending correction amount table 40. The bending correction amount able 40 is created, for example, by a developer working for a manufacturer or a service technician by optically reading, for each of the colors, a deviation amount which is caused by deflection at the center portion of the belt. In FIG. 12, ten bending correction amount tables 40 are registered. That is because, even if the same image forming apparatus 100 is utilized, the amount of the bending may be varied, for example, by temperature (e.g. the temperature in the vicinity of the conveyance belt), line velocity, or age deterioration.

The developer working for the manufacturer, the service technician, or the like creates the bending correction amount tables 40 by changing these conditions. For example, the numbers 0-2 are the bending correction amount tables 40 for corresponding cases, in each of which the temperature is 60 degrees Celsius, and the line velocity is one of A, B, and C. The numbers 3-5 are the bending correction amount tables 40 for corresponding cases, in each of which the temperature is 90 degrees Celsius, and the line velocity is one of A, B, and C. The numbers 6-9 are the bending correction amount tables 40, which are the previous bending correction amount tables 40, or the bending correction amount tables 40 which are to be suitably selected by a user's side (by the user or by the service technician). By registering the plurality of the bending correction amount tables 40, for each environment, the optimized bending correction can be executed.

The numerical values, which are registered for the corresponding colors, are the skew amounts applied to the first half portion and the latter half portion. These numerical values correspond to the skew amount B in FIG. 11C. The bending amounts assume that the direction of the gradient is changed at the center in the main scanning direction. In this manner, the bending correction can be executed, while separating the first half portion and the latter half portion in the main scanning direction, and thereby the calculation of the correction amounts can be facilitated.

Figure 13:
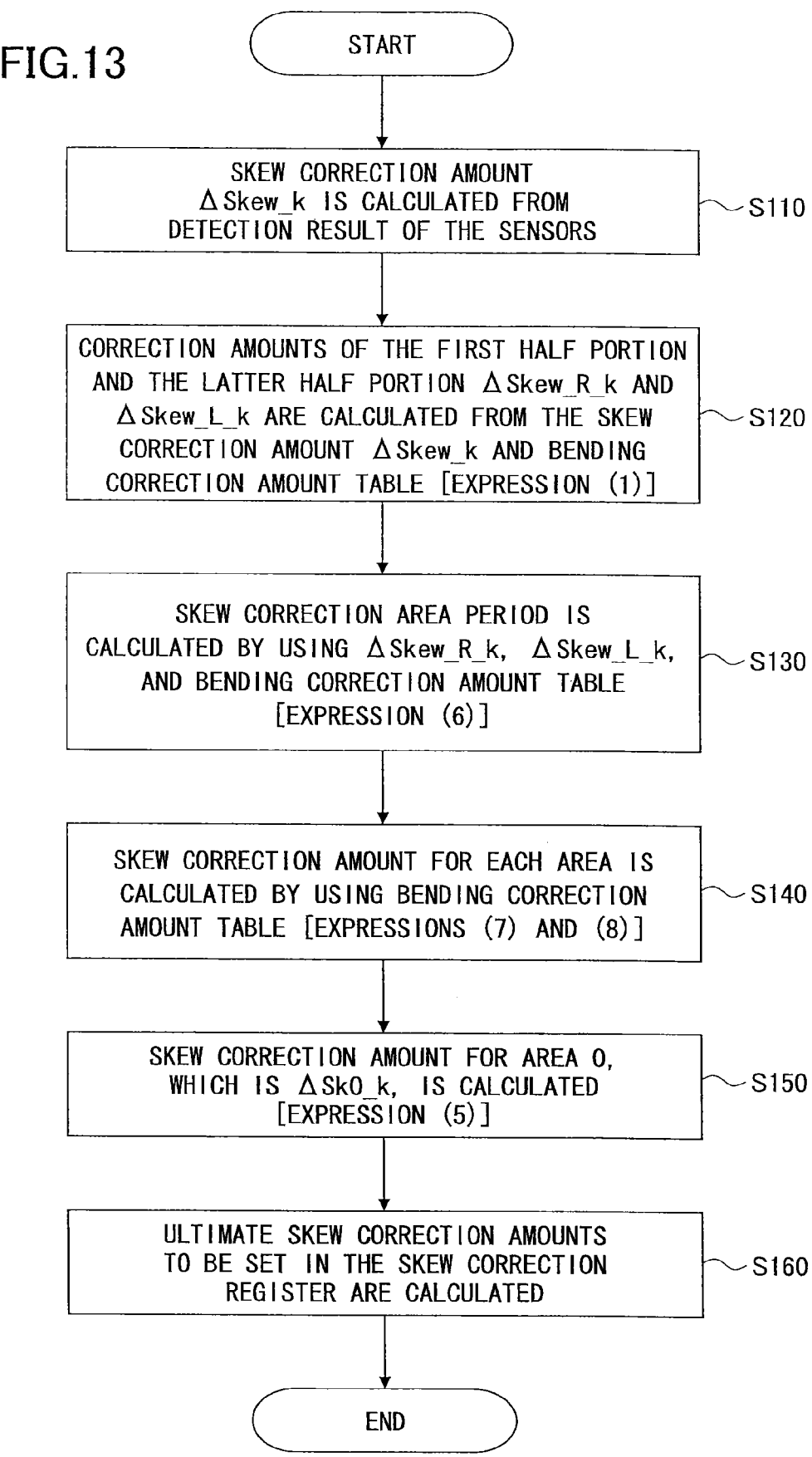
FIG. 13 is a flowchart showing an example of the calculation procedure of the skew correction amount, which includes the bending correction.

FIG. 13 is a flowchart illustrating an example of a procedure of calculating the skew correction amounts including the bending correction. The procedure of FIG. 13 is substantially the same as that of FIG. 9, but the procedure of FIG. 13 is different from that of FIG. 9 in a point that the bending amount is considered.

The correction amount calculation unit 39 calculates the skew correction amount $\Delta Skew\_k$ from the detection result of the TM sensors 17 and 19 (S110).

The correction amount calculation unit 39 obtains the correction amounts $\Delta Skew\_R\_k$ for the first half portion and $\Delta Skew\_L\_k$ for the latter half portion from the skew correction amount $\Delta Skew\_k$ (S120).

$$\Delta Skew\_R\_k = \Delta Skew\_k/2$$

$$\Delta Skew\_L\_k = \Delta Skew\_k/2 \qquad (1)$$

The correction amount calculation unit 39 obtains the skew correction area periods ΔSkew_cyc_R_k and ΔSkew_cyc_L_k by using the ΔSkew_R_k, ΔSkew_L_k, and the bending correction amount table 40 (S130).

$$\Delta \text{Skew\_cyc\_}R\_k = 72/(\text{abs}\{\Delta \text{Skew\_}R\_k + \Delta \text{Curve\_}k\} + 1)$$

$$\Delta \text{Skew\_cyc\_}L\_k = 72/(\text{abs}\{\Delta \text{Skew\_}L\_k - \Delta \text{Curve\_}k\} + 1) \quad (6)$$

The sign of ΔCureve_k in the expression (6) may be varied depending on the definitions of the positive direction and the negative direction. However, it suffices if the sign for the first half portion is opposite to the sign for the latter half portion.

Next, the correction amount calculation unit 39 calculates the skew correction amounts for the corresponding areas by using the bending correction amount table 40 (S140). Here, "x," "y," "i," and "n" are the same as described above.

For the First Half Portion:

$$x = \text{round}\{\Delta \text{Skew\_cyc\_}R\_k * i, 0\}$$

$$\Delta \text{Skew}x\_k = (\Delta \text{Skew\_}R\_k + \Delta \text{Curve\_}k)/\text{abs}\{\Delta \text{Skew\_}R\_k + \Delta \text{Curve\_}k\}$$

$$\Delta \text{Skew}y\_k = 0 (y = n, \text{ and } y \neq x) \quad (7)$$

For the Latter Half Portion:

$$x = \text{round}\{\Delta \text{Skew\_cyc\_}L\_k * i, 0\}$$

$$\Delta \text{Skew}x\_k = (\Delta \text{Skew\_}L\_k - \Delta \text{Curve\_}k)/\text{abs}\{\Delta \text{Skew\_}L\_k - \Delta \text{Curve\_}k\}$$

$$\Delta \text{Skew}y\_k = 0 (y = n, \text{ and } y \neq x) \quad (8)$$

Next, the peak values of the skew correction amounts for the all areas are obtained, and the skew correction amount ΔSk0_k is calculated (S150).

$$\Delta Sk1\_k = 0 \quad (5)$$
$$\Delta Sk2\_k = \Delta Sk1\_k + \Delta Skew2\_k$$
$$\Delta Sk3\_k = \Delta Sk2\_k + \Delta Skew3\_k$$
$$\Delta Sk4\_k = \Delta Sk3\_k + \Delta Skew4\_k$$
$$\Delta Sk5\_k = \Delta Sk4\_k + \Delta Skew5\_k$$
$$\Delta Sk6\_k = \Delta Sk5\_k + \Delta Skew6\_k$$
$$\Delta Sk7\_k = \Delta Sk6\_k + \Delta Skew7\_k$$
$$\vdots$$
$$\Delta Sk142\_k = \Delta Sk141\_k + \Delta Skew142\_k$$
$$\Delta Sk143\_k = \Delta Sk142\_k + \Delta Skew143\_k$$
$$\Delta Sk\_max\_k = \max\{\Delta Sk2\_k, \Delta Sk3\_k, \Delta Sk4\_k, \Delta Sk5\_k, \ldots, \Delta Sk142\_k, \Delta Sk143\_k\}$$
$$\Delta Sk\_min\_k = \min\{\Delta Sk2\_k, \Delta Sk3\_k, \Delta Sk4\_k, \Delta Sk5\_k, \ldots, \Delta Sk142\_k, \Delta Sk143\_k\}$$
$$\Delta Sk0\_k = \text{abs}\{\Delta Sk\_min\_k\}$$

Based on the calculated ΔSk0_k and ΔSkew#_k, the correction amount calculation unit 39 calculates ultimate skew correction amounts ΔSksft#_k and ΔSkphs#_k (S160), which are to be set in a skew correction register.

$$\Delta Sksft0\_k = \Delta Sk0\_k$$
$$\Delta Sksft1\_k = 0$$
$$\Delta Skphs1\_k = 0$$
$$\Delta Sksft2\_k = \text{abs}\{\Delta Skew2\_k\}$$
$$\Delta Skphs2\_k = \text{code}\{\Delta Skew2\_k\}$$
$$\Delta Sksft3\_k = \text{abs}\{\Delta Skew3\_k\}$$
$$\Delta Skphs3\_k = \text{code}\{\Delta Skew3\_k\}$$
$$\Delta Sksft4\_k = \text{abs}\{\Delta Skew4\_k\}$$
$$\Delta Skphs4\_k = \text{code}\{\Delta Skew4\_k\}$$
$$\Delta Sksft5\_k = \text{abs}\{\Delta Skew5\_k\}$$
$$\Delta Skphs5\_k = \text{code}\{\Delta Skew5\_k\}$$
$$\vdots$$
$$\Delta Sksft142\_k = \text{abs}\{\Delta Skew142\_k\}$$
$$\Delta Skphs142\_k = \text{code}\{\Delta Skew142\_k\}$$
$$\Delta Sksft143\_k = \text{abs}\{\Delta Skew143\_k\}$$
$$\Delta Skphs143\_k = \text{code}\{\Delta Skew143\_k\}$$

Similarly, the skew correction amounts for Cyan, Magenta, and Yellow are calculated.

As explained above, by preparing the bending correction amount table 40, the skew correction can be executed which corrects both the bending and gradient, without increasing the number of the optical sensors from the two optical sensors, which are disposed at the left and right positions.

Figure 14A:
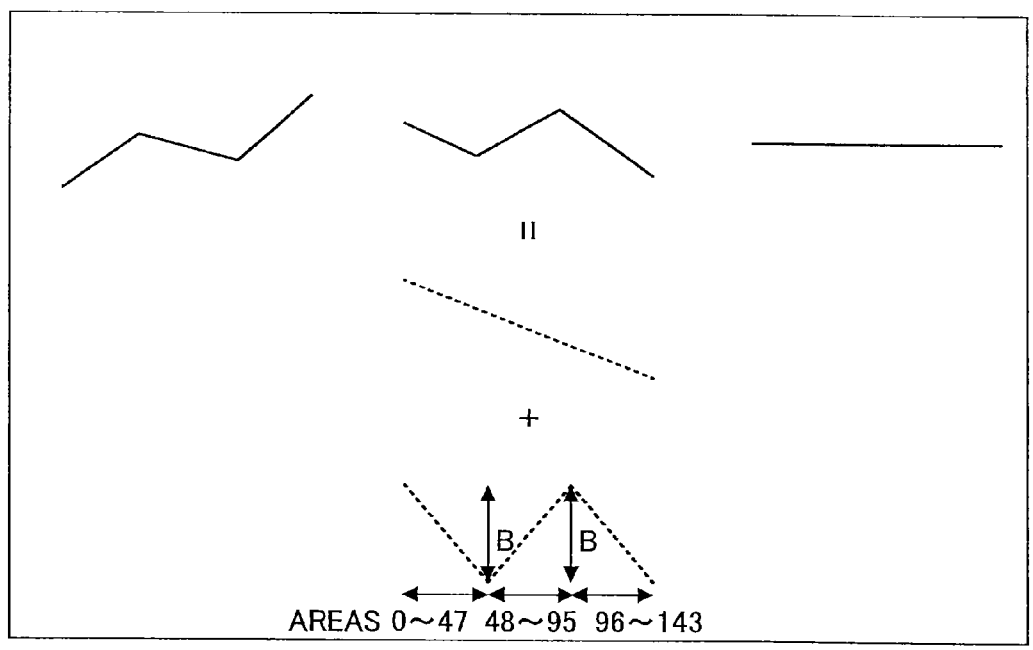
FIGS. 14A and 14B are diagrams schematically illustrating examples in which the bending correction and the skew correction are applied.

In the embodiment, the example of the bending correction is explained for the case in which the gradient is changed only once in the middle in the main scanning direction. However, a case can be similarly handled in which the bending is such that the gradient changes more than once. FIG. 14A is a diagram schematically illustrating an example of the skew correction which includes the bending correction for a case in which the gradient changes more than once in the middle of the main scanning direction. In this case, the bending amounts B are registered in the bending correction amount table 40. The correction amount calculation unit 39 executes the similar calculations by dividing the main scanning direction into three pieces, which are the areas from 0-47, the areas 48-95, and the areas 96-143.

Figure 14B:
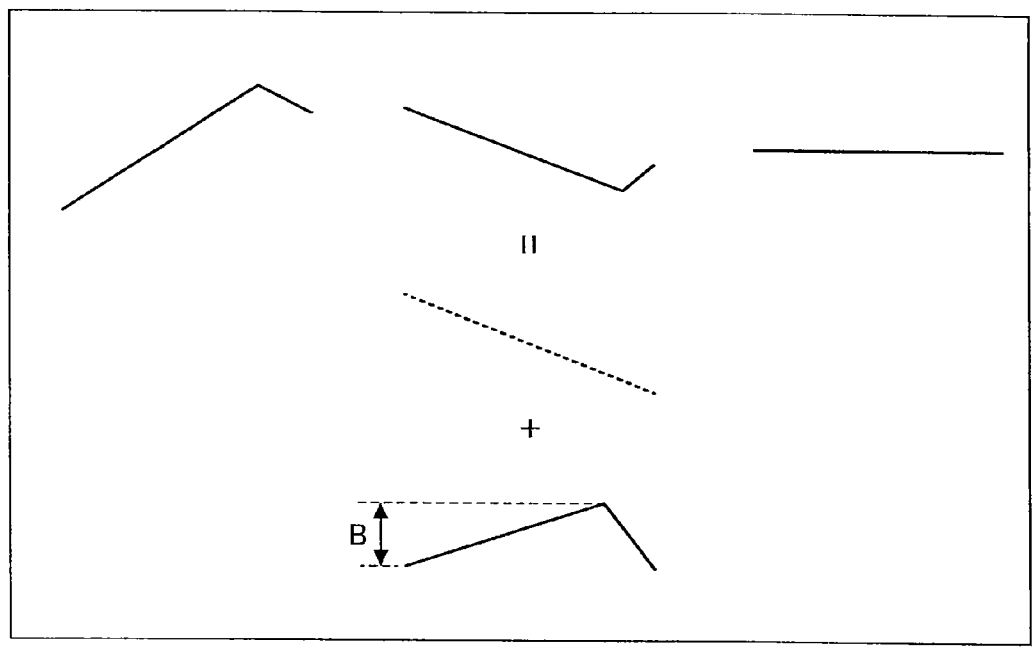

Further, in the embodiment, it is assumed that the gradient changes at the center in the main scanning direction. However, the apex of the bending may be positioned at any suitable position. FIG. 14B is a diagram schematically illustrating an example of the skew correction, which includes the bending correction for a case in which the peak of the bending is positioned at a suitable position. In this case, the bending correction amount table 40 registers the bending amounts B and the position of the peak in the main scanning direction. In this case, in which the position at which the gradient changes is not at the center, the correction can be executed in a similar manner, by calculating the correction amounts for the front portion and for the rear portion of the position at which the gradient changes.

The present invention is not limited to the specifically disclosed embodiment, and variations and modifications may be made without departing from the scope of the present invention.

The present application is based on and claims the benefit of priority of Japanese Priority Application No. 2012-260158 filed on Nov. 28, 2012, the entire contents of which are hereby incorporated herein by reference.

What is claimed is:

1. An image forming apparatus comprising:
an exposure unit configured to expose a photoreceptor based on image data;
a developing unit configured to develop the exposed photoreceptor by a developer;
a transfer unit configured to transfer an image formed on the photoreceptor by the developer onto a recording medium;
a fixing unit configured to fix the image on the recording medium;
an image data storage unit configured to store the image data in units of a line in a main scanning direction;
an inclination amount detection unit configured to detect a first inclination amount of a first portion of the image data relative to the main scanning direction, wherein the first portion of the image data spans from one end to the other end in the main scanning direction;
an inclination amount storage unit configured to store, when a gradient of the image data changes at a point in the main scanning direction, a second inclination amount of a second portion of the image data relative to the main scanning direction, wherein the second portion of the image data spans from the one end in the main scanning direction to the point, or the second portion of the image data spans from the other end in the main scanning direction to the point;
a correction amount calculation unit configured to calculate correction amounts associated with the main scanning direction, wherein the correction amount calculation unit is configured to calculate the correction amounts by switching, at the point in the main scanning direction as a boundary, whether the first inclination amount is increased by the second inclination amount or the first inclination amount is decreased by the second inclination amount; and
an image correction unit configured to correct the image,
wherein, when the image data is read out from the image data storage unit in the units of the line in the main scanning direction, the image correction unit corrects the image by adjusting timing to read out the image data based on the correction amounts,
wherein the inclination amount storage unit registers a plurality of second inclination amounts associated with corresponding environmental information,
wherein the correction amount calculation unit calculates the correction amounts by using the second inclination amount read out from the inclination amount storage unit in accordance with the environmental information at a time of outputting the image data, and
wherein the environmental information includes temperature and line velocity.

2. The image forming apparatus according to claim 1,
wherein the correction amount calculation unit is configured to calculate the inclination amount of the portion of the image data spanning from the one end to the point by adding the second inclination amount to a half of the first inclination amount, and the correction amount calculation unit is configured to calculate the inclination amount of the portion of the image data spanning from the point to the other end by subtracting the second inclination amount from the half of the first inclination amount; or wherein the correction amount calculation unit is configured to calculate the inclination amount of the portion of the image data spanning from the one end to the point by subtracting the second inclination amount from the half of the first inclination amount, and the correction amount calculation unit is configured to calculate the inclination amount of the portion of the image data spanning from the point to the other end by adding the second inclination amount to the half of the first inclination amount.

3. The image forming apparatus according to claim 1,
wherein the point is at a center in the main scanning direction.

4. An image correction method of an image forming apparatus, wherein the image forming apparatus includes an exposure unit configured to expose a photoreceptor based on image data, a developing unit configured to develop the exposed photoreceptor by a developer, a transfer unit configured to transfer an image formed on the photoreceptor by the developer onto a recording medium, a fixing unit configured to fix the image on the recording medium, and an image data storage configured to store the image data in units of line in a main scanning direction, the method comprising:
a step of detecting a first inclination amount of a first portion of the image data relative to the main scanning direction, wherein the first portion of the image data spans from one end to the other end in the main scanning direction;
a step of calculating correction amounts associated with the main scanning direction, by referring to an inclination amount storage configured to store, when a gradient of the image data changes to an opposite direction at a point in the main scanning direction, a second inclination amount of a second portion of the image data relative to the main scanning direction, wherein the second portion of the image data spans from the one end in the main scanning direction to the point, or the second portion of the image data spans from the other end in the main scanning direction to the point, and by switching, at the point in the main scanning direction as a boundary, whether the first inclination amount is increased by the second inclination amount or the first inclination amount is decreased by the second inclination amount, the inclination amount storage registering a plurality of second inclination amounts associated with corresponding environmental information, the environmental information including temperature and line velocity; and
a step of correcting the image,
wherein, when the image data is read out from the image data storage in the units of the line in the main scanning direction, the step of correcting corrects the image by adjusting timing to read out the image data based on the correction amounts, and
wherein the step of calculating calculates the correction amounts by using the second inclination amount read out from the inclination amount storage in accordance with the environmental information at a time of outputting the image data.

5. An apparatus comprising:
an inclination amount detection unit configured to detect a first inclination amount of a first portion of image data relative to a main scanning direction, wherein the first portion of the image data spans from one end to the other end in the main scanning direction;
an inclination amount storage unit configured to store, when a gradient of the image data changes at a point in the main scanning direction, a second inclination amount of a second portion of the image data relative to the main scanning direction, wherein the second portion of the image data spans from the one end in the main scanning direction to the point, or the second portion of the image data spans from the other end in the main scanning direction to the point;

a correction amount calculation unit configured to calculate correction amounts associated with the main scanning direction, wherein the correction amount calculation unit is configured to calculate the correction amounts by switching, at the point in the main scanning direction as a boundary, whether the first inclination amount is increased by the second inclination amount or the first inclination amount is decreased by the second inclination amount; and an image correction unit configured to correct an image, wherein, when the image data is read out in units of a line in the main scanning direction, the image correction unit corrects the image by adjusting timing to read out the image data based on the correction amounts, wherein the inclination amount storage unit registers a plurality of second inclination amounts associated with corresponding environmental information, wherein the correction amount calculation unit calculates the correction amounts by using the second inclination amount read out from the inclination amount storage unit in accordance with the environmental information at a time of outputting the image data, and wherein the environmental information includes temperature and line velocity.

* * * * *